US011215988B2

(12) United States Patent
Cho et al.

(10) Patent No.: US 11,215,988 B2
(45) Date of Patent: Jan. 4, 2022

(54) ACCOMPANYING CONTROL OF LOCOMOTION DEVICE

(71) Applicants: Hanwoo Cho, West Lafayette, IN (US); Sangha Cho, Ann Arbor, MI (US); Whang Cho, Seoul (KR)

(72) Inventors: Hanwoo Cho, West Lafayette, IN (US); Sangha Cho, Ann Arbor, MI (US); Whang Cho, Seoul (KR)

(*) Notice: Subject to any disclaimer, the term of this patent is extended or adjusted under 35 U.S.C. 154(b) by 329 days.

(21) Appl. No.: 16/535,143

(22) Filed: Aug. 8, 2019

(65) Prior Publication Data
US 2021/0041866 A1   Feb. 11, 2021

(51) Int. Cl.
| *G05D 1/00* | (2006.01) |
| *G05D 1/02* | (2020.01) |
| *B25J 9/16* | (2006.01) |
| *B25J 5/00* | (2006.01) |
| *B25J 9/02* | (2006.01) |

(52) U.S. Cl.
CPC ............ *G05D 1/0038* (2013.01); *B25J 5/007* (2013.01); *B25J 9/023* (2013.01); *B25J 9/1664* (2013.01); *B25J 9/1697* (2013.01); *G05D 1/0248* (2013.01); *G05B 2219/40202* (2013.01)

(58) Field of Classification Search
CPC ................ G05D 1/00; G05D 1/02; B25J 9/16
See application file for complete search history.

(56) References Cited

U.S. PATENT DOCUMENTS

| 7,211,980 | B1 | 5/2007 | Bruemmer | |
| 7,302,321 | B2* | 11/2007 | Suzuki | ................. G08G 1/0962 340/932 |
| 8,116,921 | B2 | 2/2012 | Ferrin et al. | |
| 8,496,078 | B2* | 7/2013 | Wellborn | ............. G05D 1/0234 180/14.2 |
| 8,706,298 | B2 | 4/2014 | Goulding | |
| 9,201,425 | B2 | 12/2015 | Yoon | |
| 9,242,378 | B2* | 1/2016 | Matsumoto | .......... G05D 1/0274 |
| 2007/0233318 | A1 | 10/2007 | Lei | |

(Continued)

FOREIGN PATENT DOCUMENTS

| CN | 106056633 A | 10/2016 |
| WO | WO2013/059423 | 4/2013 |

OTHER PUBLICATIONS

"Effidence/Salon de l'Agriculture 2015/Les Echos," YouTube, Jun. 10, 2015 [retrieved on May 8, 2017], retrieved from URL:https://www.youtube.com/watch?v=P5iGW5bxMoo, 1 page [A screen shot of the video].

(Continued)

*Primary Examiner* — Kira Nguyen
(74) *Attorney, Agent, or Firm* — Fish & Richardson P.C.

(57) ABSTRACT

A control system includes a locomotion device that is configured to accompany a moving object such as a human operator or a robotic device. The control system is configured to control a motion of the locomotion device based on a location of at least one of the moving object relative to the locomotion device or a location of the locomotion device relative to the moving object. The control system is configured to control the locomotion device to maintain a position of the locomotion device with respect to the moving object to thereby synchronize the motion of the locomotion device with a motion of the moving object.

19 Claims, 27 Drawing Sheets

(56) References Cited

U.S. PATENT DOCUMENTS

| | | | | |
|---|---|---|---|---|
| 2009/0012666 A1* | 1/2009 | Simpson | ............. | G05D 1/0293 |
| | | | | 701/23 |
| 2012/0271483 A1* | 10/2012 | Samukawa | ......... | B60W 10/184 |
| | | | | 701/1 |
| 2018/0078444 A1* | 3/2018 | Gamerman | ............ | A61H 3/061 |
| 2019/0375103 A1* | 12/2019 | Cui | ...................... | G06K 9/6273 |

OTHER PUBLICATIONS

PCT International Search Report and Written Opinion in International Application No. PCT/US2019/066697, dated May 12, 2020, 16 pages.

* cited by examiner

ACCOMPANYING CONTROL OF LOCOMOTION DEVICE

TECHNICAL FIELD

This disclosure relates generally to accompanying control of a locomotion device that is configured to move by its own power.

BACKGROUND

Recent advancements in technology related to design of efficient electric motors and energy storage methods enabled various electrical locomotion devices. For example, the locomotion devices may include personal locomotion devices such as a robotic travel luggage, an intelligent shopping cart, etc.

In some examples, a human following locomotion system may be controlled to follow a path of a human operator while avoiding obstacles if necessary. One of the methods used in a human following device may include obtaining information about the human operator's location relative to a locomotion device by real-time processing of human images obtained by one or more cameras installed on the device. In these examples, the human operator may be free from the device. In some cases, the cameras may malfunction, for example, under illumination changes, and an accurate motion control would be difficult in a congested environment.

In other examples, a human following control system may use wireless communication technology such as an ultra-wide band or Bluetooth technology, etc. In some cases of wireless communication technology, an accuracy of following control may be limited by a precision level of localization information of a human operator.

In some examples, ultrasonic transducer systems may be used. For instance, at least two ultrasonic receivers installed on a locomotion device may track ultrasonic waves generated from an ultrasonic transmitter carried by a human operator. In some cases of ultrasonic communication, an interference may be caused by waves from other transmitters or indirect transmission of waves due to reflection of the waves from an environment, and a human following control based on ultrasonic communication techniques may be limited in an accuracy, precision, or latency of the control.

SUMMARY

This disclosure describes an accompanying locomotion system that can accompany a moving object. For example, the locomotion system may accompany a human operator. In some implementations, the accompanying locomotion systems may be different from other object following systems that are controlled to follow a path of a moving object such as a human operator. In some implementations, a human accompanying locomotion system is controlled to move based on a movement of the human operator in a synchronized fashion, maintaining a range from the human operator (e.g., a constant position or a range relative to a human operator) and avoiding obstacle if necessary. For example, the human accompanying locomotion system may be placed at any position relative to a human operator during operation. In particular, the human accompanying locomotion system may be controlled to accompany the human operate at any of positions in front of, at the back of, on the left side of, or on the right side of the human operator.

This disclosure also describes an accompanying control method of a locomotion device that includes a power source. In some examples, the control system may include at least one position measurement system utilizing polar coordinates to locate a point on a moving object such as a human operator relative to the locomotion device. The control system may obtain information about a motion of the moving object and a location of the moving object relative to the locomotion device through a position measurement system. The control system may control the locomotion device based on the obtained information such that the locomotion device accompanies the moving object at a constant position relative to the moving object.

According to one aspect of the subject matter described in this application, a system configured to accompany a moving object includes at least one locomotion device configured to move on a ground surface and to be controlled based on at least two degrees of freedom of motion on the ground surface, a coordinates measurement unit configured to measure polar coordinates of the moving object relative to the locomotion device, and a controller configured to, based on the polar coordinates of the moving object relative to the locomotion device, control a motion of the locomotion device to maintain a position of the locomotion device within a preset range with respect to the moving object. The polar coordinates of the moving object relative to the locomotion device is determined based on polar coordinates of a point on the moving object relative to a reference coordinates system fixed to the locomotion device.

Implementations according to this aspect may include one or more of the following features. For example, the locomotion device includes a power source configured to supply power that enables the motion of the locomotion device, and a driving device configured to move the locomotion device based on the power supplied from the power source. In some examples, the polar coordinates of the moving object include a distance component that represents a distance between a first point of the moving object projected onto the ground surface and a second point of the locomotion device projected onto the ground surface, and an angle component that represents an angle defined by an extension line from the first point to the second point on the ground surface with respect to a reference line passing the second point on the ground surface. The controller is configured to control the motion of the locomotion device to maintain at least one of the distance component or the angle component within a range from preset values.

In some implementations, the locomotion device includes one of: an omnidirectional-drive device configured to drive the locomotion device based on three degrees of freedom of motion on the ground surface; a differential-drive device including two wheels configured to rotate about rotation axes that are collinear and that are configured to be independently controlled; a tricycle-drive device including at least one steering wheel configured to control a travel direction of the locomotion device and at least one driving wheel configured to move the locomotion device; or a legged-drive device including at least two legs that are configured to be independently controlled. In some implementations, the system further includes a string dispensing tube that is coupled to the coordinates measurement unit and that is configured to accommodate and dispense a string configured to connect the locomotion device to the moving object.

In some implementations, the coordinates measurement unit includes a retractable string mechanism including: a body disposed at the locomotion device; a string configured to be dispensed from and retracted into the body; a first rotary sensor configured to measure a length of a dispensed portion of the string; a second rotary sensor configured to measure an orientation of the dispensed portion of the string with respect to the locomotion device; and a tension device configured to provide a tension to the string to thereby allow the string to be retracted into the body. The string may have a predetermined length. In some examples, the tension device includes a spiral torsion spring connected to the string. In some examples, the tension device includes an electric motor connected to the string and configured to control the tension in the string.

In some implementations, the controller is further configured to: obtain sequential data including at least one of a length or an orientation of the dispensed portion of the string as a function of time; recognize predefined signal patterns or gestures of the moving object from the sequential data; and perform tasks corresponding to the recognized signal patterns or gestures.

In some implementations, the coordinates measurement unit includes a laser distance measurement system configured to output light and receive returned light, where the laser distance measurement system is configured to: generate a set of range data including a plurality of polar coordinates corresponding to a plurality of points of the moving object relative to the locomotion device; and output, among the set of range data, one of the plurality of polar coordinates corresponding to at least one point of the moving object relative to the locomotion device.

In some implementations, the polar coordinates measurement unit includes a camera system configured to capture images, where the camera system is configured to: based on the images, generate a set of range data including a plurality of polar coordinates corresponding to a plurality of points of the moving object relative to the locomotion device; and output, from the set of range data, one of the plurality of polar coordinates corresponding to at least one point of the moving object relative to the locomotion device.

In some implementations, the controller is further configured to, based on polar coordinates of a point of the moving object projected onto the ground surface, control the motion of the locomotion device to maintain the polar coordinates of the point of the moving object relative to the locomotion device within a range from a preset value.

In some implementations, the controller is further configured to: obtain Cartesian coordinates of a point of the moving object projected onto the ground surface based on a polar-to-Cartesian transformation of polar coordinates of the point of the moving object projected onto the ground surface; and based on the Cartesian coordinates of the point of the moving object projected onto the ground surface, control the motion of the locomotion device to maintain the Cartesian coordinates of the point of the moving object relative to the locomotion device within a range from a preset value. Here, the Cartesian coordinates includes at least two distance components defined along two axes that are orthogonal to each other.

In some implementations, the coordinates measurement unit includes a retractable string mechanism including: a body disposed at the locomotion device; a string configured to be dispensed from and retracted into the body; a rotary sensor configured to measure a length of a dispensed portion of the string; a force sensor configured to measure each of a tension in the string and an orientation of the dispensed portion of the string with respect to the locomotion device; and a tension device configured to provide the tension to the string to thereby allow the string to be retracted into the body. The string may have a predetermined length.

In some implementations, the coordinates measurement unit includes a retractable string mechanism including: a string configured to be elongated by a tension applied to the string; and a force sensor configured to measure each of the tension applied to the string, an orientation of the elongated string with respect to the locomotion device, and a length of the elongated string.

In some implementations, the controller is configured to: in an accompanying mode, control the motion of the locomotion device based on both of (i) a distance between the moving object and the locomotion device and (ii) an angle of a direction of the moving object with respect to the locomotion device to thereby maintain the distance and the angle within a preset distance range and a preset angle range, respectively; and in a following mode, control the motion of the locomotion device based on the distance between the moving object and the locomotion device to maintain the distance within the preset distance range.

In some implementations, the controller is further configured to: define a plurality of regions around the locomotion device; determine whether the position of the moving object corresponds to one of the plurality of regions; and control the motion of the locomotion device according to the one of the plurality of regions.

According to another aspect, a system configured to accompany a moving object includes at least one locomotion device configured to move on a ground surface and to be controlled based on at least two degrees of freedom of motion on the ground surface, a coordinates measurement unit configured to measure polar coordinates of the locomotion device relative to the moving object, and a controller configured to, based on the polar coordinates of the locomotion device relative to the moving object, control a motion of the locomotion device to maintain a position of the locomotion device within a preset range with respect to the moving object. The polar coordinates of the locomotion device relative to the moving object are determined based on polar coordinates of a point on the locomotion device relative to a reference coordinates system fixed to the moving object.

Implementations according to this aspect may include one or more of the features described above.

Implementations of the described techniques may include hardware, a method or process implemented at least partially in hardware, or a computer-readable storage medium encoded with executable instructions that, when executed by one or more processors, perform operations.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
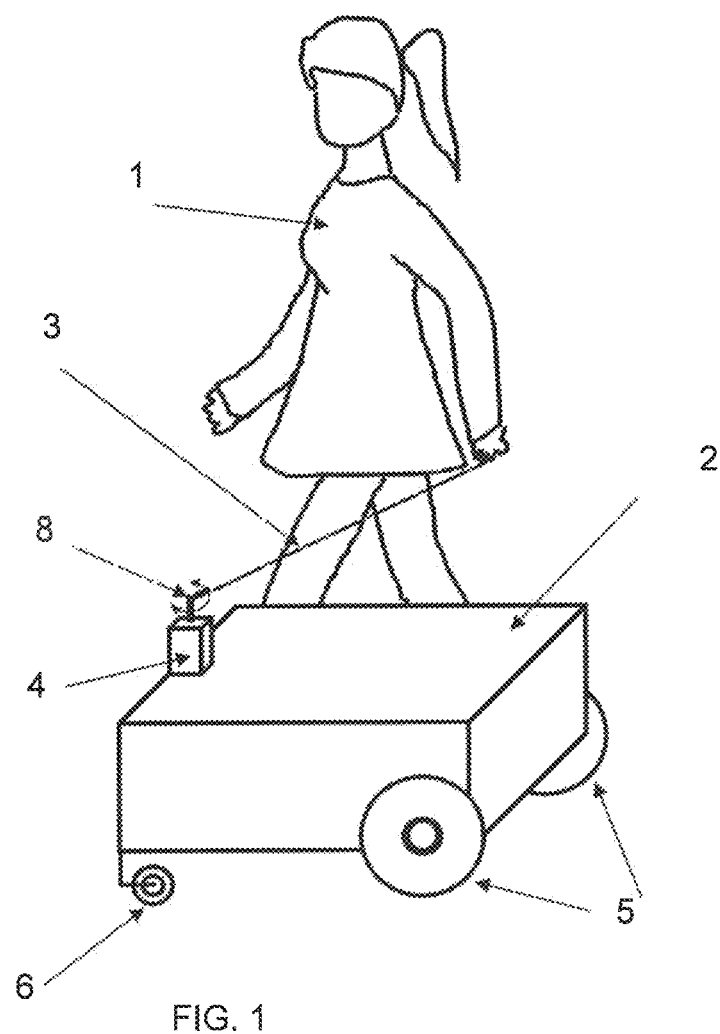
FIG. 1 illustrates an example of an accompanying locomotion system including a self-powered locomotion device connected to a human operator through a string.

FIG. 1 depicts an example of a human accompanying operation of a locomotion device. For example, the locomotion device may be driven by a driving device that includes two motorized wheels for a differential drive. In some examples, the locomotion device includes a power source to drive wheels 5, and may be referred to as a "self-powered" locomotion device 2. For example, the power source includes a battery, a solar panel, a fuel cell, an engine, etc. The locomotion device 2 further includes one or more controllers configured to, based on controlling the wheels 5, control a motion of the locomotion device 2. The controller includes a processor and a non-transitory memory storing instructions configured to cause the processor to perform accompanying control of the locomotion device 2. In some implementations, the locomotion device 2 includes one or more auxiliary wheels 6 that support the locomotion device 2 together with the driving wheels 5 on a ground plane (i.e., a ground surface).

In some implementations, a string 3 is dispensed through a string dispensing tube 8 as a human operator 1 pulls out the string 3 out of a retractable string mechanism 4 installed on the self-powered locomotion device 2. The retractable string mechanism 4 includes a sensor installed inside the retractable string mechanism 4 and is configured to measure a length and a direction of a portion of the string 3 dispensed through the string dispensing tube 8. The string dispensing tube 8 is rotatably mounted on the retractable string mechanism 4. In some implementations, the self-powered locomotion device 2 is configured to, based on the length of the dispensed portion of the string 3 reaching a predetermined value, begin to move to accompany the human operator 1. In some implementations, a moving object such as a robotic device, a mobile cart, etc. corresponds to the human operator 1. Thus, in the present disclosure, the human operator 1 and the moving object may be interchangeably used.

The locomotion device 2 may perform a human accompanying operation by regulating both of the length and the relative orientation of the pulled string within preset values. The locomotion device 2 may, by regulating both the length and the orientation of the string at preset values, accompany the human operator 1 while maintaining a constant position relative to the human operator 1. The human accompanying operation minimizes a physical interaction, e.g., a tension in the string 3 connecting the human operator 1 to the locomotion device 2. For instance, the tension may be maintained by a spiral torsion spring at a proper level while avoiding an unacceptable amount of slack in the string 3. In another, the tension in the string 3 may be actively controlled by a motor between a first level greater than a threshold tensile force corresponding to a loose state and a second level less than a maximum tensile force corresponding a tense state that the human operator 1 can withstand.

Figure 2:
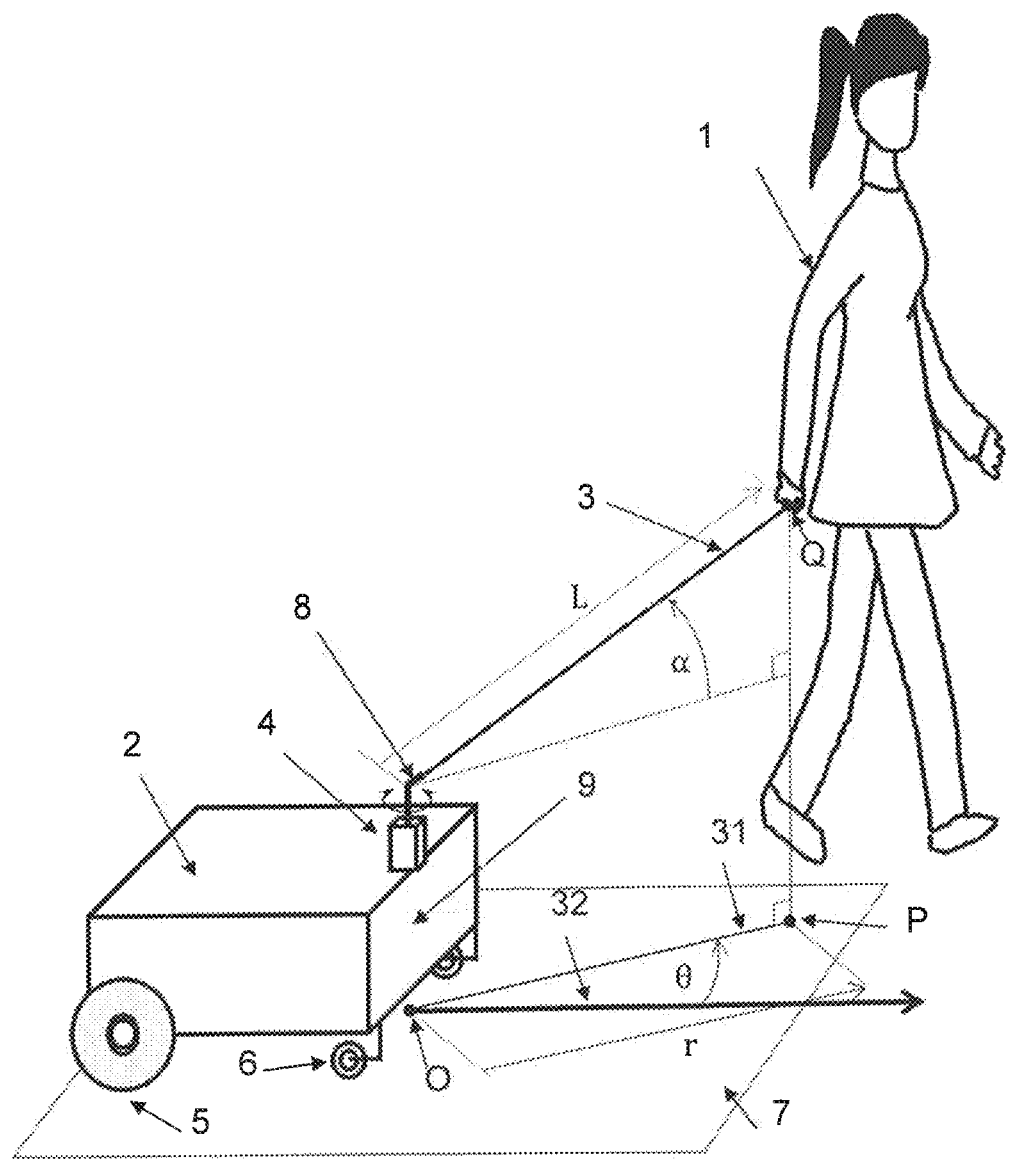
FIG. 2 illustrates example variables L, $\alpha$, r, and $\theta$ that represent a length of an example string and an orientation of the string relative to an example locomotion device.

FIG. 2 illustrates multiple variables for the human accompanying control. For example, an orientation angle θ of the string 3 represents an angle between a projection line 31 obtained by projecting the string 3 perpendicularly onto a ground plane 7 and a reference line 32 that is parallel to the ground plane 7 and that extends in a fixed direction relative to the locomotion device 2. Therefore, the angle θ represents an orientation of the human operator 1 relative to the locomotion device 2. L denotes a length of a portion of the string 3 dispensed from the retractable string mechanism 4, and P denotes a point that is perpendicularly projected from a human-side end (the point Q) of the string 3 onto the ground plane 7. As the human operator 1 moves on the ground plane 7, the position of the point Q relative to the locomotion device 2 may change, and therefore L and θ may vary accordingly. It is assumed that the string 3 has a predetermined length that does not change or change in a negligible amount by the tension in the string 3.

FIG. 2 also illustrates two more variables r and α in addition to the variables θ and L. The variable r represents a distance between the point O and the point P, where the point O is a point where an axis 9 of rotation of the string dispensing tube 8 intersects the ground plane 7. That is, the variable r represents a projected length of L onto the ground plane 7. The variable α represents an elevation angle of the string 3 relative to a plane parallel to the ground plane 7. The four variables r, L, α, and θ may change as the human operator 1 moves on the ground plane 7.

In some implementations, the human accompanying control to maintain the locomotion device 2 at a constant position relative to the human operator 1 may be accomplished by regulating primarily two variables r and θ at preset constant values, respectively. The variables r and θ may be used as two variables of polar coordinates that represent the point P relative to the point O. In some examples, controlling θ as well as r at preset values may enable maintaining, during the human accompanying operation, a relative configuration of the locomotion device 2 with respect to human operator 1. In some examples, r may be indirectly determined by an equation r=L cos(α).

Figure 3A:
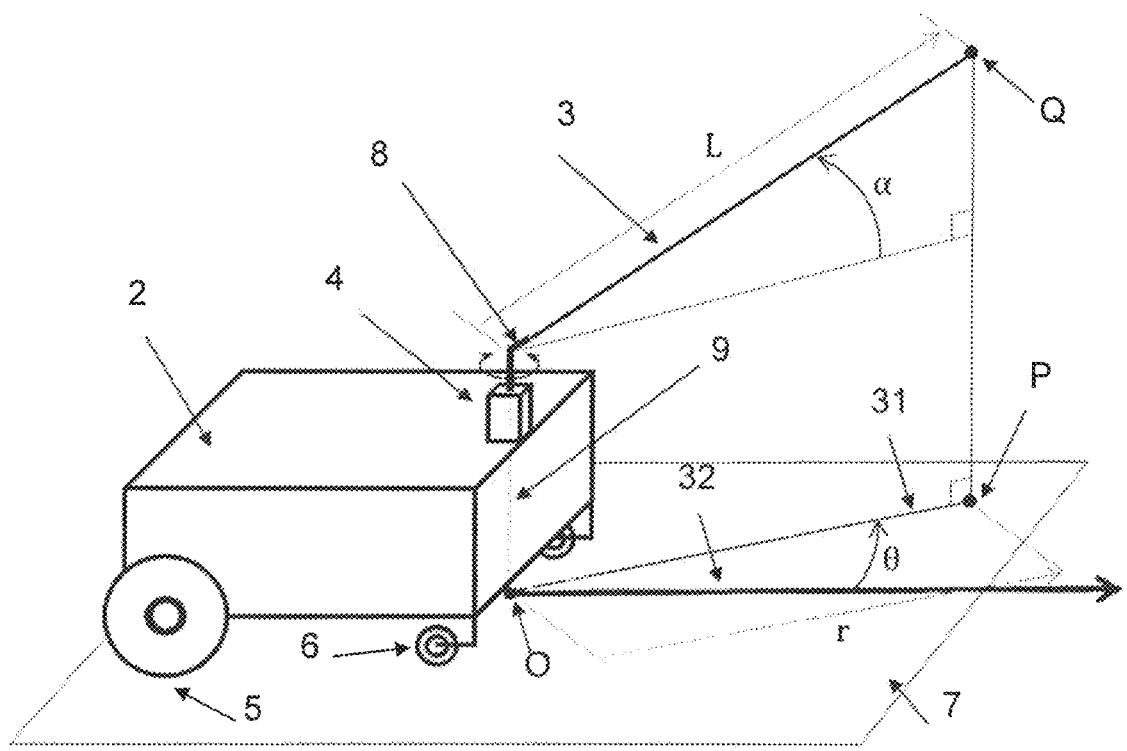
FIGS. 3A and 3B illustrate an example of an accompanying controller configured to operate based on polar coordinates.
Figure 3B:
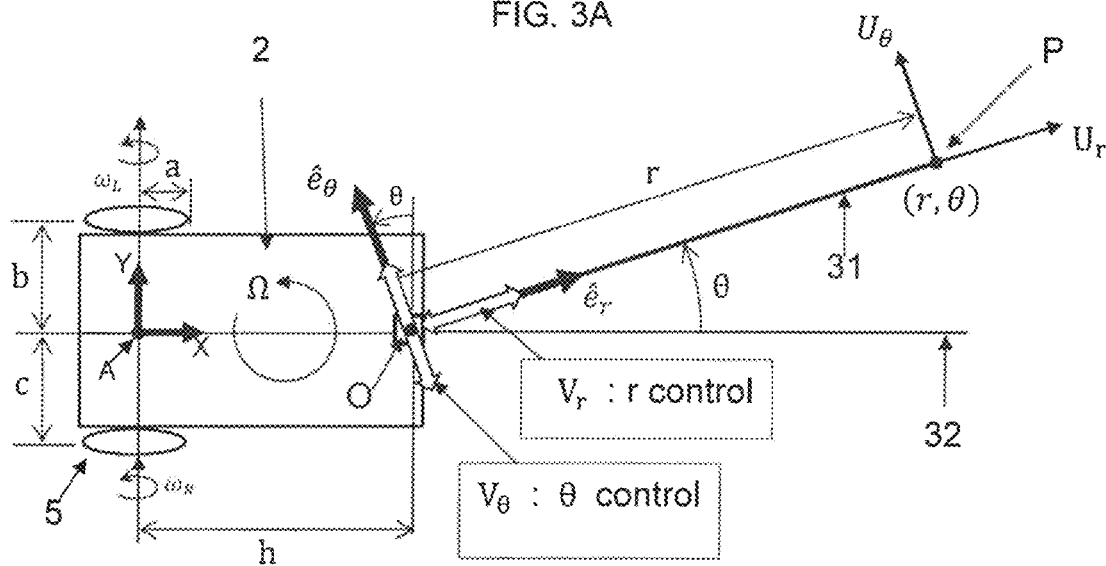

Referring to FIGS. 3A and 3B, the locomotion device 2 includes at least two degrees of freedom mobility on the ground plane 7, where an instantaneous center (IC) of rotation of the locomotion device 2 may be located at an arbitrary point on the ground plane 7. In some examples, the locomotion device 2 may have three degrees of freedom mobility, i.e., an omnidirectional mobility, including two degrees of freedom translational mobility and one degree of freedom rotational mobility on the ground plane. Many different accompanying control methods may be devised depending on how to utilize one or more redundant degrees of freedom mobility.

One example method may be to use the two degrees of freedom translational mobility in controlling a position of the locomotion device 2 and the remaining one degree of freedom rotational mobility to control an orientation of the locomotion device 2. FIG. 3A illustrates the locomotion device 2 configured to be driven by a differential drive mechanism including two independently speed-controllable wheels whose axes are collinear, which allows the locomotion device 2 to move based on two degrees of freedom mobility. In some examples, the locomotion device 2 may include a legged-drive device that includes at least two legs (e.g., robotic legs) that are configured to be independently controlled.

In some implementations, an accompanying control may include two different accompanying control methods. The first method is to control coordinates of a fixed point of a moving object (e.g., the human operator 1) with respect to a coordinates system fixed to the locomotion device 2. By contrast, the second method is to control coordinates of a fixed point of the locomotion device 2 with respect to a coordinate system fixed to the moving object. The two control methods, therefore, approach the accompanying control from opposite perspectives. In some implementations, the two methods may be interchangeably used depending on operational situations to maximize advantages of both of the methods.

The first method controls coordinates of a fixed point of the moving object 1 with respect to a coordinates system fixed to the locomotion device 2. In some implementations, the first method may use a polar coordinates system or a Cartesian coordinates system.

One or more accompanying control techniques will be described using a polar coordinates system.

In FIG. 3B, a Cartesian coordinate system X-Y defined as a fixed coordinate system on the locomotion device 2 may translate and rotate relative to the ground plane 7. For example, an origin A may be located on a common axis of the driving wheels 5 and spaced apart from a left wheel and a right wheel by distances b and c, respectively. X and Y axes may be set up as shown in FIG. 3B. The point O may be located on the X axis and spaced apart from the origin A by a distance h.

An absolute velocity of the moving object 1 (i.e., the velocity of the point Q relative to the ground) may be projected on the ground plane 7 and decomposed into $U_r$ and $U_\theta$ using a polar coordinate system whose origin is located at the point O with two unit vectors $\hat{e}_r$ and $\hat{e}_\theta$ defined as shown in FIG. 3B. An absolute velocity of the point O (i.e., the velocity of the point O relative to the ground) may be decomposed similarly into $V_r$ and $V_\theta$. As human moves on the ground plane 7 with a velocity defined by $U_r$ and $U_\theta$, a controller for accompanying control regulates both the length L of the string 3 and the orientation angle θ of the string 3 at preset values by controlling the velocity of the point O, which is governed by the angular speeds $\omega_L$ and $\omega_R$ of the left and right driving wheels 5, respectively. In this example shown in FIG. 3B, a positive direction of rotation of both wheels 5 is assumed to be aligned with positive Y axis in view of the right-hand rule. Both wheels 5 are assumed to have a radius a.

An accompanying control method using polar coordinates is described referring to FIGS. 3A and 3B. A position of the point P with respect to the point O is defined by using polar coordinates (r, θ). In order to control the length L of the string 3, the motion of the point O is generated along the radial direction, i.e., along the straight line connecting the two points θ and P. In other words, the length L of the string is controlled by controlling its projected length r as indicated by "r control" in FIG. 3B. To increase the length L, the motion of the point O is generated to move away from the point P, while to decrease the length L, the motion of the point O is generated to move toward the point P.

In controlling the orientation angle θ of the string 3, the motion of the point O is generated in a transversal direction, e.g., a direction perpendicular to the straight line connecting the two points θ and P, as indicated by "θ control" in FIG. 3B. To increase the angle θ, the motion of the point O is generated such that the point O moves along a circle of radius r with center at P in counterclockwise direction, while to decrease the angle θ, the motion of the point O is generated such that the point O moves along a circle of radius r with center at P in clockwise direction.

A kinematic relationship that relates a time rate of changes of two components r and θ of polar coordinates of the point P relative to the point O to the velocity of the moving object (i.e., $U_r$ and $U_\theta$) and the velocity of the point O (i.e., $V_r$ and $V_\theta$) may be readily expressed as the following equations ("Eqn.").

$$\frac{dr}{dt} = U_r - V_r \qquad \text{Eqn. <1>}$$

$$\frac{d\theta}{dt} = \frac{U_\theta - V_\theta}{r} - \Omega \qquad \text{Eqn. <2>}$$

Ω denotes the angular speed of the locomotion device 2 relative to the ground and may be expressed as the following equation.

$$\Omega = \frac{V_\theta \cos\theta + V_r \sin\theta}{h} \quad \text{Eqn. <3>}$$

Using Eqn. <3>, Eqn. <2> may be rewritten as $$\frac{d\theta}{dt} = \frac{1}{r}U_\theta - \frac{\sin\theta}{h}V_r - \left(\frac{1}{r} + \frac{\cos\theta}{h}\right)V_\theta \quad \text{Eqn. <4>}$$

Figure 4:
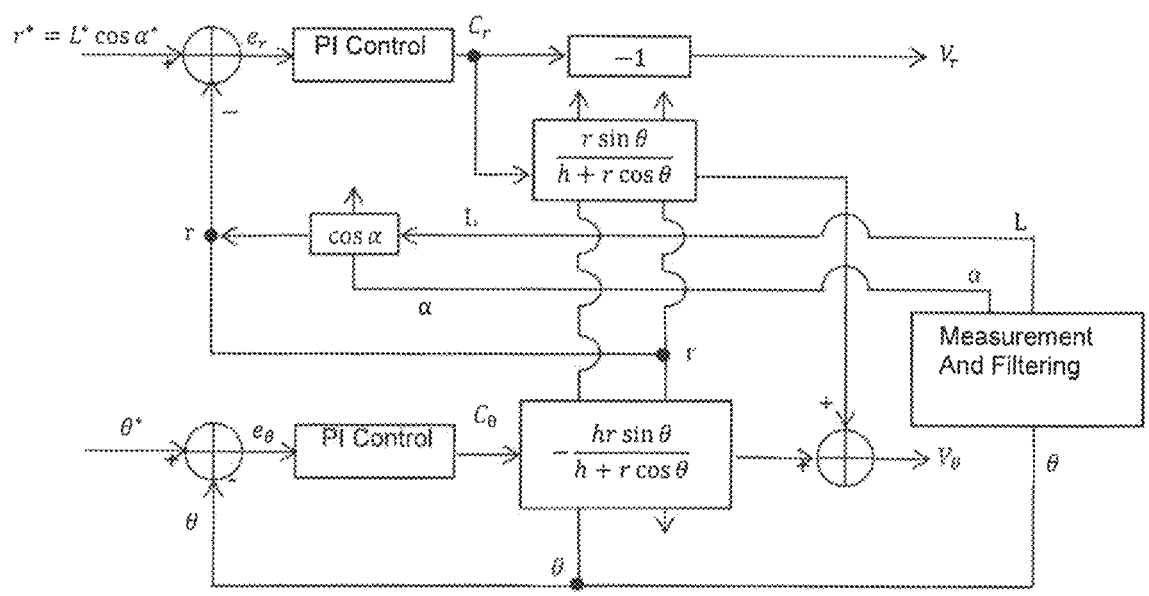
FIGS. 4 and 5 together illustrate a block diagram representing an example of an accompanying controller to operate based on polar coordinates.

In some implementations, a controller uses Eqns. <1> and <4> as a kinematic model of the system. Suppose the desired length L*, the desired orientation θ*, and the desired elevation angle α* of the string are set by the human operator 1. Then, r* is set by L* cos α*. FIG. 4 shows a block diagram of an example of an accompanying controller. The radial error $e_r = r^* - r$ and the angle error $e_\theta = \theta^* - \theta$ is regulated by two PI (proportional and integral) controllers which produce the outputs $C_r$ and $C_\theta$, respectively, as $$C_r = K_{pr} e_r + K_{ir} \int e_r dt \quad \text{Eqn. <5>}$$

$$C_\theta = K_{p\theta} e_\theta + K_{i\theta} \int e_\theta dt \quad \text{Eqn. <6>}$$

where $K_{pr}$, $K_{ir}$, $K_{p\theta}$, and $K_{i\theta}$ are proportional and integral gains for the controllers. The outputs of the PI controller are combined to yield the required velocity components $V_r$ and $V_\theta$ of the point O as $$V_r = -C_r \quad \text{Eqn. <7>}$$

$$V_\theta = -\frac{hr}{h + r\cos\theta} C_\theta + \frac{r\sin\theta}{h + r\cos\theta} C_r. \quad \text{Eqn. <8>}$$

In some cases, even though $C_r$ and $C_\theta$ are designed using constant gains, $V_\theta$ may become a nonlinear function of r and θ, implying $V_\theta$ being dependent on a current location of the point P. In some examples, the velocity $V_r$ and $V_\theta$ of the point O are designed so that the systems described by Eqns. <1> and <4> behave like two decoupled stable second order systems under the input velocities $U_r$ and $U_\theta$ of the point P, and that denominator of Eqn. <8> becomes zero when r cos θ=−h, i.e., when the point P is on the axis of differential drive wheels 5, which implies $V_\theta$ becomes infinite and the angle error $e_\theta = \theta_0 - \theta$ may not be controlled at this singular configuration due to the intrinsic motion constraint imposed by the differential drive system.

In FIG. 4, the "measurement and filtering" block measures signals and then passes the signals through a signal filter in order to reduce or eliminate possible noise caused by fluctuation of the string 3 during operation.

Now from kinematic relationships of differential drive mechanism, the required angular speeds $\omega_L^*$ and $\omega_R^*$ of left and right wheel can be obtained respectively as $$\omega_L^* = \left(\frac{1}{a}\cos\theta - \frac{b}{ha}\sin\theta\right)V_r - \left(\frac{1}{a}\sin\theta + \frac{b}{ha}\cos\theta\right)V_\theta \quad \text{Eqn. <9>}$$

$$\omega_R^* = \left(\frac{1}{a}\cos\theta + \frac{c}{ha}\sin\theta\right)V_r - \left(\frac{1}{a}\sin\theta - \frac{c}{ha}\cos\theta\right)V_\theta \quad \text{Eqn. <10>}$$

Figure 5:
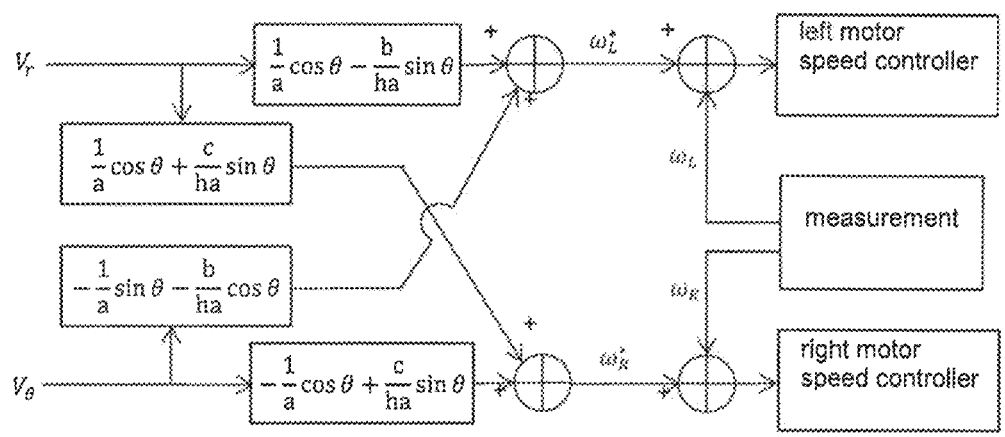

Note that in obtaining Eqns. <9> and <10> it is assumed that the two driving wheels 5 do not slip on the ground plane 7. The angular speeds $\omega_L^*$ and $\omega_R^*$ obtained by using Eqns. <5>-<10> are used as reference speeds for the speed controller for left and right wheel, respectively. FIGS. 4 and 5 together depict overall structure of the example human accompanying controller realized in terms of polar coordinates.

One or more accompanying control techniques will be described using Cartesian coordinates.

Figure 6A:
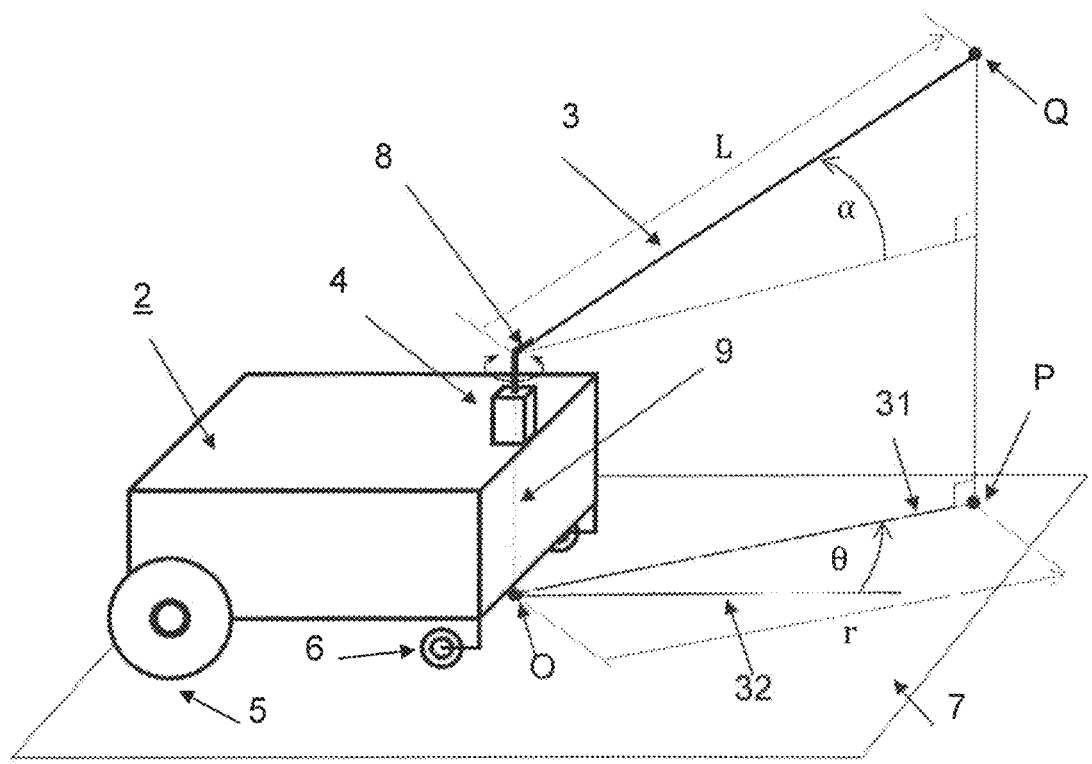
FIGS. 6A and 6B illustrate an example of an accompanying controller configured to operate based on Cartesian coordinates.
Figure 6B:
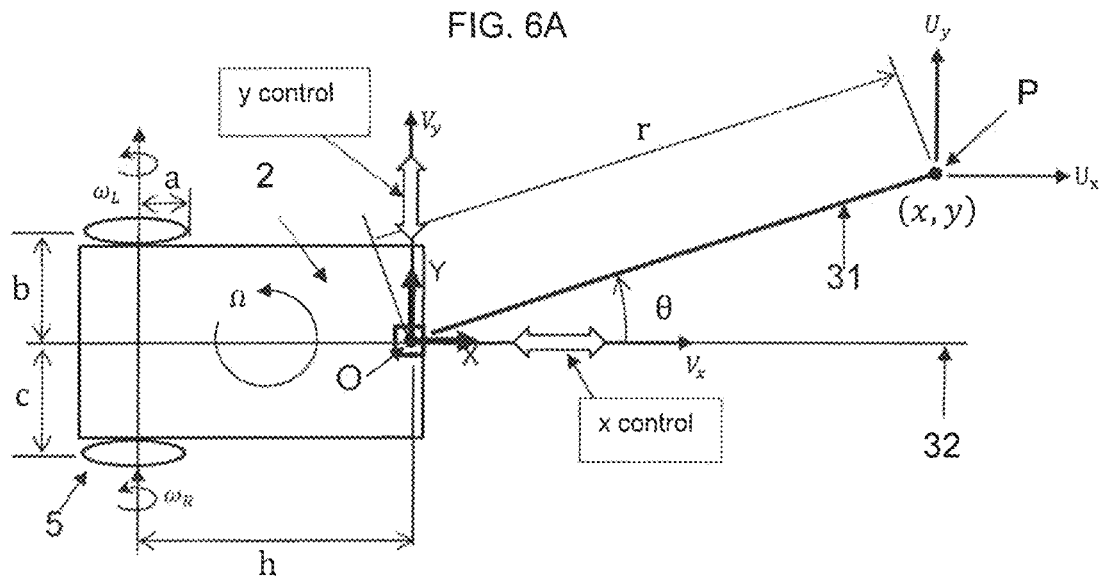

FIG. 6A shows an example system including a locomotion device 2 including one or more wheels 5 and 6, a retractable string mechanism 4 mounted on an upper surface of the locomotion device 2, a string 3 connected to the retractable string mechanism 4, and a string dispensing tube 8 disposed at the retractable string mechanism 4 and configured to dispense and receive the string 3. FIG. 6B shows a Cartesian coordinate system X-Y attached to the locomotion device 2 at the point O. The Cartesian coordinate system X-Y may be a translating and rotating coordinate system. Positive X and Y axes are assumed to be pointing forward and to the left of the locomotion device 2, respectively. The coordinates of the point P relative to X-Y frame are given by (x, y) and a time rate of change of each component may be expressed as $$\frac{dx}{dt} = U_x - V_x + \Omega y \quad \text{Eqn. <11>}$$

$$\frac{dy}{dt} = U_y - V_y - \Omega x \quad \text{Eqn. <12>}$$

where $U_x$ and $U_y$ respectively denote X and Y components of the velocity of the point P, $V_x$ and $V_y$ respectively denote X and Y components of the velocity of the point P, and Ω denotes the angular speed of the locomotion device relative to the ground and may be expressed as $$\Omega = \frac{V_y}{h} \quad \text{Eqn. <13>}$$

Substituting Eqn. <13> into Eqns. <11> and <12>, the kinematic model of the system may be obtained as $$\frac{dx}{dt} = U_x - V_x + \frac{y}{h}V_y \quad \text{Eqn. <14>}$$

$$\frac{dy}{dt} = U_y - \left(\frac{h+x}{h}\right)V_y \quad \text{Eqn. <15>}$$

Figure 7:
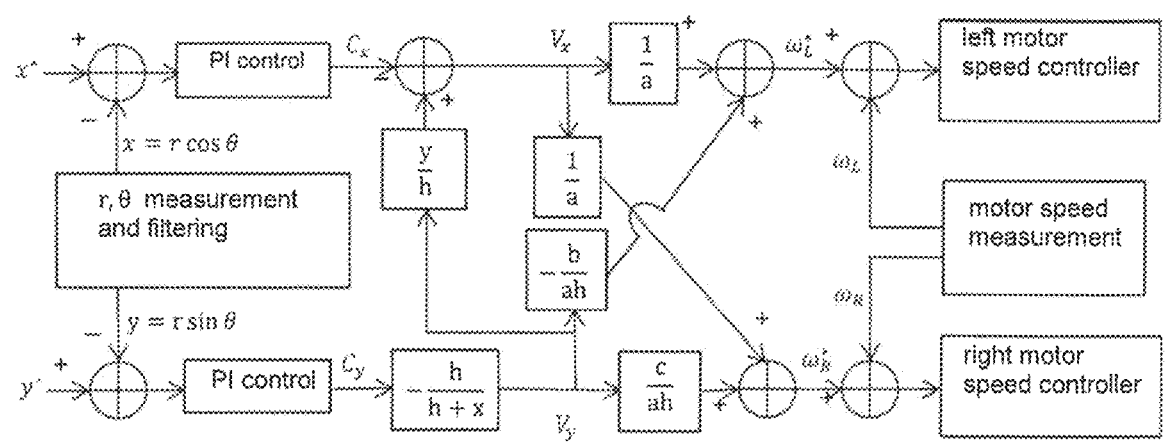
FIG. 7 illustrates a block diagram representing an example of an accompanying controller configured to operate based on Cartesian coordinates.

Suppose a desired location of the point P relative to the point O is set by using Cartesian coordinates (x*, y*). Then a PI controller that regulates the relative location of the point P relative to the point O at (x*, y*) may be employed as shown in FIG. 7. The errors $e_x = x^* - x$ and $e_y = y^* - y$ may be regulated by two PI (proportional and integral) controllers which produce the outputs $C_x$ and $C_y$, respectively, as $$C_x = K_{px} e_x + K_{ix} \int e_x dt \quad \text{Eqn. <16>}$$

$$C_y = K_{py} e_y + K_{iy} \int e_y dt \quad \text{Eqn. <17>}$$

where $K_{px}$, $K_{ix}$, $K_{py}$, and $K_{iy}$ are proportional and integral gains for the controllers. The outputs of the PI controller are combined to yield the required velocity components $V_x$ and $V_y$ of the point O as $$V_y = -\frac{h}{h+x}C_y \quad \text{Eqn. <18>}$$

-continued $$V_x = -C_x + \frac{y}{h} V_y \qquad \text{Eqn. <19>}$$

In some cases, even though $C_x$ and $C_y$ are designed using constant gains, $V_x$ and $V_y$ may turn out to be nonlinear functions of x and y, implying $V_x$ and $V_y$ being dependent on a current location of the point P. In some examples, the velocity $V_x$ and $V_y$ of the point O are designed so that the system described by Eqns. <14> and <15> behaves like two decoupled stable second order systems under the input velocities $U_x$ and $U_y$ of the point P, and that when x=−h, i.e., when the point P is on the axis of differential drive wheels 5, neither the x error $e_x=x_0-x$ nor the y error $e_y=y_0-y$ may be controlled at this configuration due to the intrinsic motion constraint imposed by differential drive system. When x=−h, $V_y$ may be set to zero, i.e., no control is performed for the y error, and only the x error may be controlled using $V_x=-C_x$.

Now from the kinematic relationships of differential drive mechanism, the required angular speeds $\omega_L^*$ and $\omega_R^*$ of the left and right wheels can be obtained respectively as $$\omega_L^* = \frac{1}{a} V_x - \frac{b}{ah} V_y \qquad \text{Eqn. <20>}$$

$$\omega_R^* = \frac{1}{a} V_x + \frac{c}{ah} V_y \qquad \text{Eqn. <21>}$$

Note that in obtaining Eqns. <20> and <21> it is assumed that the two driving wheels 5 do not slip on the ground plane 7. The angular speeds $\omega_L^*$ and $\omega_R^*$ obtained by using Eqns. <16>-<21> are used as reference speeds for the speed controller for the left and right wheel, respectively. FIG. 7 depicts an overall structure of the example human accompanying controller realized in terms of Cartesian coordinates.

Hereinafter, a second method of accompanying control will be described. The second method controls coordinates of a fixed point of a locomotion device with respect to the coordinates system fixed to a moving object. The second method may be implemented using a polar coordinates system and a Cartesian coordinates system.

One or more accompanying control techniques will be described using polar coordinates.

Figure 8:
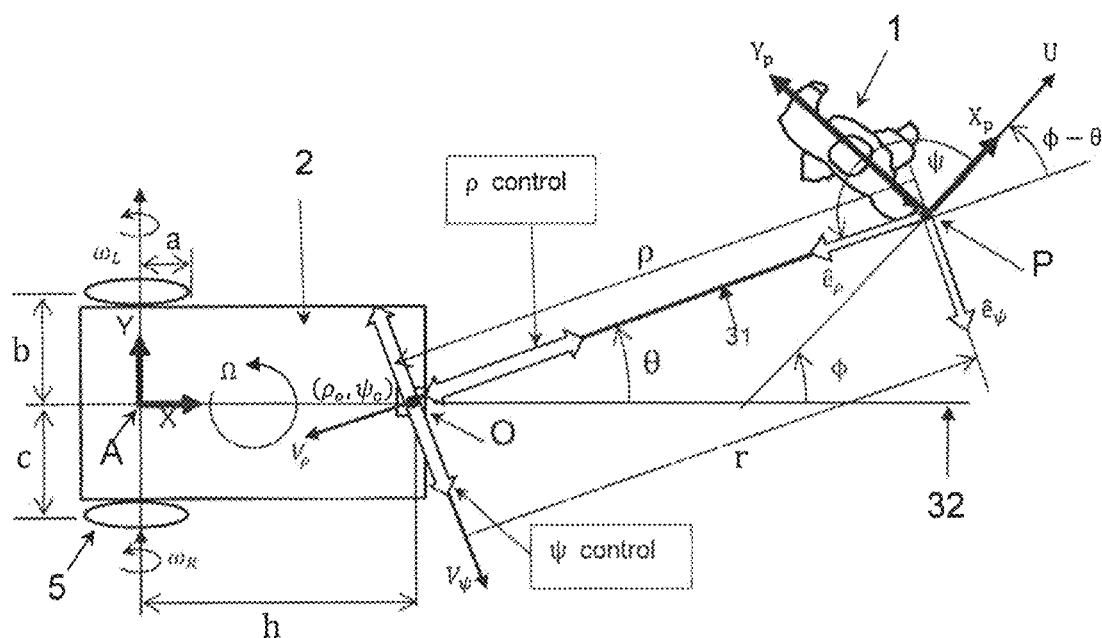
FIG. 8 illustrates another example of an accompanying controller configured to operate based on polar coordinates.

In FIG. 8, in addition to the Cartesian system XY fixed on the locomotion device 2 with an origin at the point A, anther Cartesian coordinate system $X_p Y_p$ is defined on the human operator 1. The Cartesian coordinate system $X_p Y_p$ may translate and rotate relative to the ground. As shown in FIG. 8, $X_p$ axis is aligned to point to a forward direction of the human operator 1 and corresponds to a direction of a human movement, and $Y_p$ axis is set up to point to a left side of the human operator 1. Without loss of generality, the absolute velocity $\vec{U}$ of the human operator 1 is aligned with $X_p$ axis and the orientation of the $X_p$ with respect to the XY system can be evaluated by measuring the velocity $\vec{U}$ with respect to the XY system as $$U_x = V_x + \dot{r} \cos \theta - r(\Omega + \dot{\theta}) \sin \theta \qquad \text{Eqn. <22>}$$

$$U_y = V_y + \dot{r} \sin \theta + r(\Omega + \dot{\theta}) \cos \theta \qquad \text{Eqn. <23>}$$

where r, $\dot{r}$, $\theta$, and $\dot{\theta}$ are measured by using polar coordinates measurement system, and $\Omega$, $V_x$, and $V_y$ may be obtained from the speeds of two driving wheels assuming no slip at the wheels as $$\Omega = \frac{a}{b+c}(\omega_R - \omega_L) \qquad \text{Eqn. <24>}$$

$$V_x = \frac{a}{b+c}(b\omega_R + c\omega_L) \qquad \text{Eqn. <25>}$$

$$V_y = h\Omega \qquad \text{Eqn. <26>}$$

The direction of $X_p$ or the velocity $\vec{U}$ of the human with respect to the XY system may be defined by an angle $\phi$ as $$\phi = a \tan 2(U_y, U_x) \qquad \text{Eqn. <27>}$$

The angle $\phi$ given in Eqn. <27> defines a Cartesian coordinate system $X_p Y_p$ at the point P. Now suppose the polar coordinates $(\rho_o^*, \psi_o^*)$ of the point O of the locomotion device is set to be regulated with respect to a polar coordinate system with two unit vectors $\hat{e}_\rho$ and $\hat{e}_\psi$ defined relative to $X_p Y_p$ system and the current polar coordinates of the same point are measured as $$\rho_o = r \qquad \text{Eqn. <28>}$$

$$\psi_o = \pi - \phi + \theta \qquad \text{Eqn. <29>}$$

Then the errors $e_\rho = \rho_o^* - \rho_o$ and $e_\psi = \psi_o^* - \psi_o$ may be regulated by two PI (proportional and integral) controllers which produce the outputs $C_\rho$ and $C_\psi$, respectively, as $$C_\rho = K_{p\rho} e_\rho + K_{i\rho} \int e_\rho dt \qquad \text{Eqn. <30>}$$

$$C_\psi = K_{p\psi} e_\psi + K_{i\psi} \int e_\psi dt \qquad \text{Eqn. <31>}$$

In FIG. 8, $C_\rho$ and $C_\psi$ are visualized as "$\rho$ control" and "$\psi$ control", respectively. Two outputs $C_\rho$ and $C_\psi$ can be transformed into the required velocity of the point O as $$V_\rho = C_\rho \qquad \text{Eqn. <32>}$$

$$V_\psi = \rho_o C_\psi \qquad \text{Eqn. <33>}$$

Now from the kinematic relationships of differential drive mechanism, the required angular speeds $\omega_L^*$ and $\omega_R^*$ of left and right wheel can be obtained respectively as $$\omega_L^* = -\left(\frac{1}{a}\cos\theta - \frac{b}{ha}\sin\theta\right)V_\rho + \left(\frac{1}{a}\sin\theta + \frac{b}{ha}\cos\theta\right)V_\psi \qquad \text{Eqn. <34>}$$

$$\omega_R^* = -\left(\frac{1}{a}\cos\theta + \frac{c}{ha}\sin\theta\right)V_\rho + \left(\frac{1}{a}\sin\theta - \frac{c}{ha}\cos\theta\right)V_\psi \qquad \text{Eqn. <35>}$$

Figure 9:
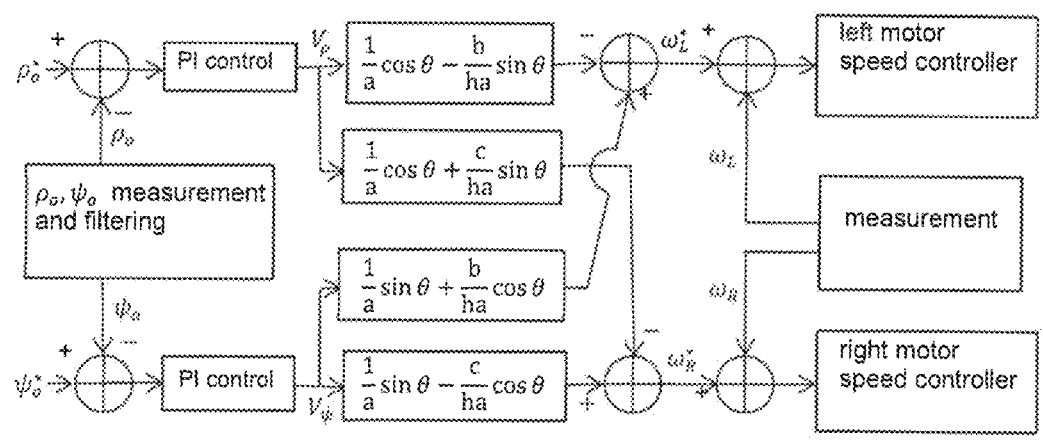
FIG. 9 depicts a block diagram of an example of an accompanying controller configured to operate based on polar coordinates.

FIG. 9 shows an overall structure of an example controller using polar coordinates described above.

One or more accompanying control techniques will be described using Cartesian coordinates.

Figure 10:
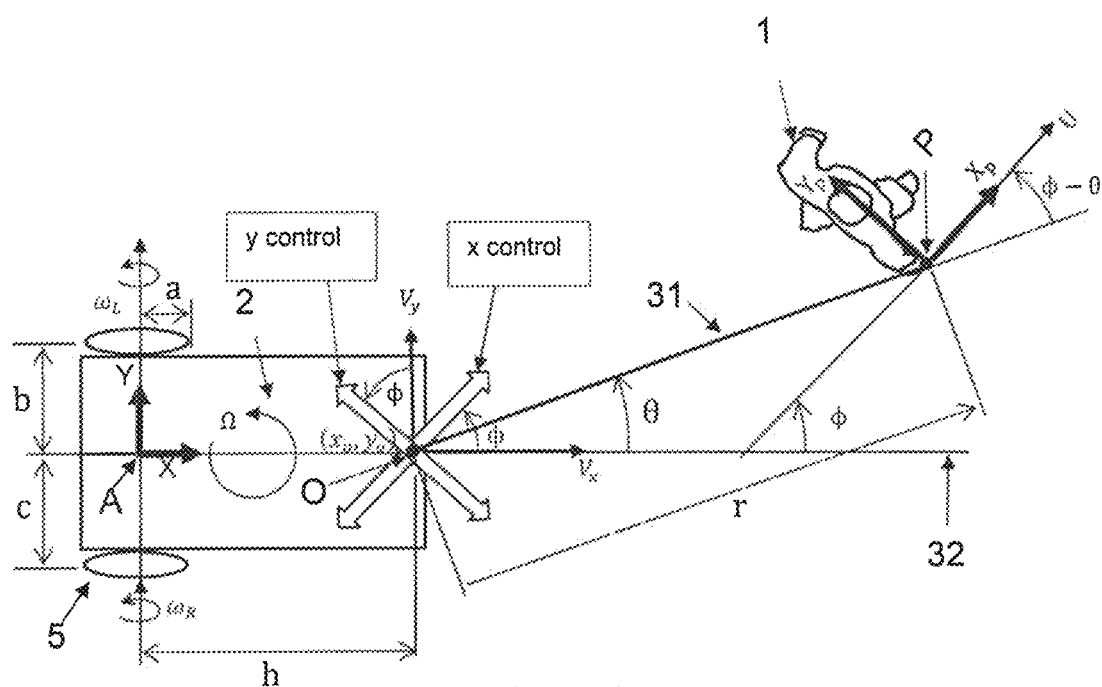
FIG. 10 illustrates another example of an accompanying controller configured to operate based on Cartesian coordinates.

In FIG. 10, in addition to the Cartesian system XY fixed on the locomotion device 2 with its origin at the point A, anther Cartesian coordinate system $X_p Y_p$ is defined on the human operator 1. The Cartesian coordinate system $X_p Y_p$ may translate and rotate relative to the ground. As shown in FIG. 10, $X_p$ axis is aligned to point a forward direction of the human and corresponds to the direction of human movement, and $Y_p$ axis is set up to point the left side of the human. The absolute velocity $\vec{U}$ of the human operator 1 may be aligned with $X_p$ axis, and the orientation of the $X_p$ with respect to the XY system may be evaluated by measuring the velocity $\vec{U}$ with respect to the XY system as $$U_x = V_x + \dot{r} \cos \theta - r(\Omega + \dot{\theta}) \sin \theta \qquad \text{Eqn. <36>}$$

$U_y = V_y + \dot{r} \sin\theta + r(\Omega+\dot{\theta})\cos\theta$      Eqn. <37> where $r$, $\dot{r}$, $\theta$, and $\dot{\theta}$ are measured by using polar coordinates measurement system, and $\Omega$, $V_x$, and $V_y$ may be obtained from the speeds of two driving wheels assuming no slip at the wheels as $$\Omega = \frac{a}{b+c}(\omega_R - \omega_L) \quad \text{Eqn. <38>}$$

$$V_x = \frac{a}{b+c}(b\omega_R + c\omega_L) \quad \text{Eqn. <39>}$$

$$V_y = h\Omega \quad \text{Eqn. <40>}$$

The direction of $X_p$ or the velocity $\vec{U}$ of the human with respect to the XY system may be defined by an angle $\phi$ as $\phi = a\tan 2(U_y, U_x)$      Eqn. <41>

Now suppose the Cartesian coordinates $(x_o^*, y_o^*)$ of the point O of the locomotion device is defined to be regulated relative to the Cartesian coordinate system $X_pY_p$ and the current coordinates of the same point is measured as $x_o = -r\cos(\phi-\theta)$      Eqn. <42>

$y_o = +r\sin(\phi-\theta)$      Eqn. <43>

Then the errors $e_x = x_o^* - x_o$ and $e_y = y_o^* - y_o$ may be regulated by two PI (proportional and integral) controllers which produce the outputs $C_x$ and $C_y$, respectively, as $C_x = K_{px}e_x + K_{ix}\int e_x dt$      Eqn. <44>

$C_y = K_{py}e_y + K_{iy}\int e_y dt$      Eqn. <45>

In FIG. 8, $C_x$ and $C_y$ are visualized as "x control" and "y control", respectively. Two outputs $C_x$ and $C_y$ can be transformed into the required velocity of the point O as $V_x = C_x \cos\phi - C_y \sin\phi$      Eqn. <46>

$V_y = C_x \sin\phi + C_y \cos\phi$      Eqn. <47>

Now from the kinematic relationships of differential drive mechanism, the required angular speeds $\omega_L^*$ and $\omega_R^*$ of left and right wheel can be obtained respectively as $$\omega_L^* = \frac{1}{a}V_x - \frac{b}{ah}V_y \quad \text{Eqn. <48>}$$

$$\omega_R^* = \frac{1}{a}V_x + \frac{c}{ah}V_y \quad \text{Eqn. <49>}$$

Figure 11:
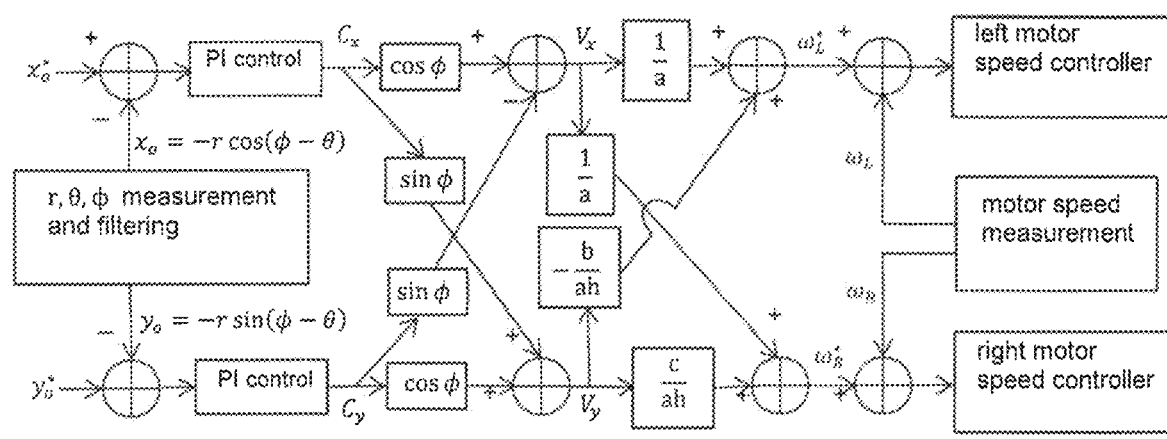
FIG. 11 depicts a block diagram of an example of an accompanying controller configured to operate based on Cartesian coordinates.

FIG. 11 shows an overall structure of an example controller using Cartesian coordinates describe above.

Hereinafter, a locomotion device including a tricycle drive system will be described.

Figure 12A:
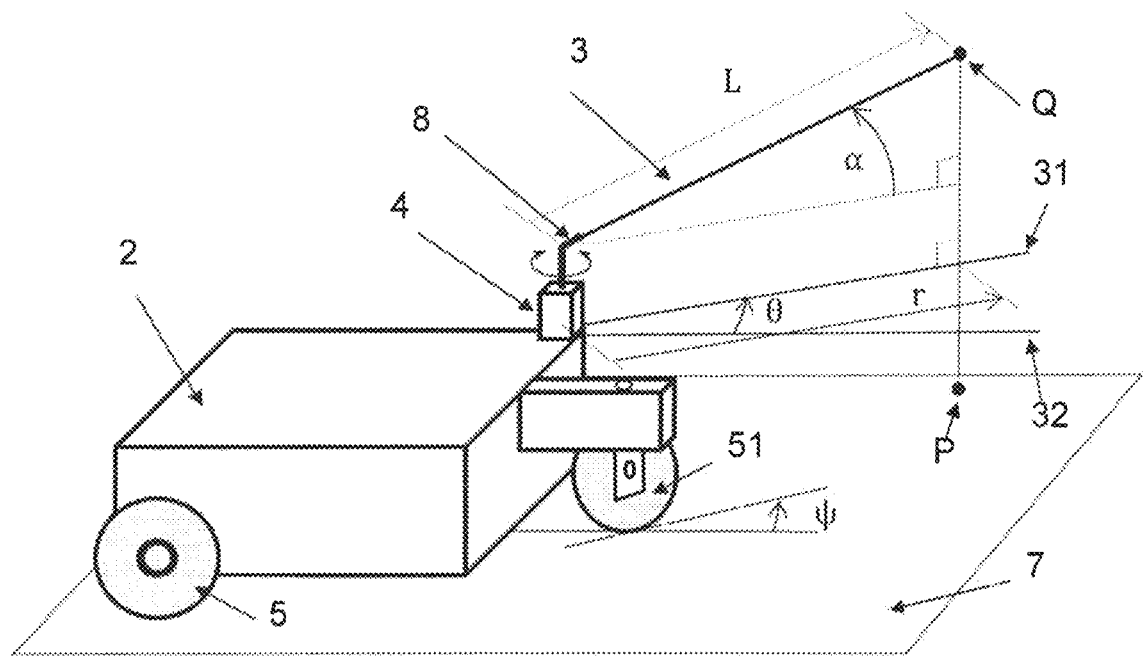
FIGS. 12A and 12B illustrate an example of a locomotion system including a tricycle drive.

FIGS. 12A and 13B show an example of a locomotion system including a tricycle drive, where the orientation $\psi$ of steered wheel 51 determines a location of the instantaneous center (IC) point of the locomotion device 2 on the common axis of rear wheels 5. In some implementations, the locomotion device 2 includes two steering wheels like a car and may be equivalently modeled as a tricycle drive system because the two steering wheels are steered in a way satisfying the Ackerman steering geometry.

In some implementations, a tricycle drive system is controlled by driving the steered wheel 51, for example, by making the steered wheel drivable at the same time by employing another motor. In this example, it is assumed without loss of generality that the wheel 51 is steered by a motor and the right wheel is driven by another motor to provide thrust to the locomotion device.

In some implementations, an accompanying controller for the tricycle drive system is obtained as follows. The outputs $V_x$ and $V_y$ of two PI controllers define a desired location of IC* point which is the point where the common axis of rear wheels intersects with the line perpendicular to the desired velocity vector V of the point O, and determine the desired angular velocity $\Omega^*$ of the locomotion device relative to the ground with which it should turn about IC* point. The desired location of IC* point may be determined by s as $$s = h\frac{V_x}{V_y} - d \quad \text{Eqn. <50>}$$

and the desired angular velocity $\Omega^*$ of the locomotion device may be obtained as $$\Omega^* = \frac{V_y}{h}. \quad \text{Eqn. <51>}$$

Using these results, the desired steering angle $\psi^*$ and the desired angular speed $\omega_R^*$ of driving wheel may be obtained respectively as $$\psi^* = \tan^{-1}\left(\frac{h+e}{s+b}\right) \quad \text{Eqn. <52>}$$

$$\omega_R^* = \frac{s+b+c}{a}\Omega^*. \quad \text{Eqn. <53>}$$

Figure 13:
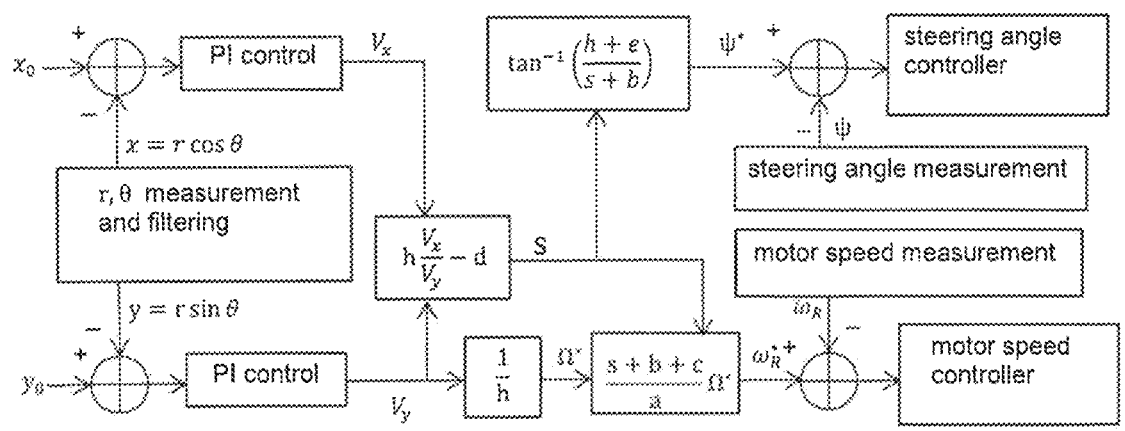
FIG. 13 illustrates a block diagram of an example of an accompanying controller including a tricycle drive.

When $V_y=0$, Eqns. <50> and <51> yield $s=\infty$ and $\Omega^*=0$, respectively, which indicates that the locomotion device 2 is in straight motion or in translational motion. FIG. 13 illustrates the structure of the controller implemented using the equations above.

Figure 14A:
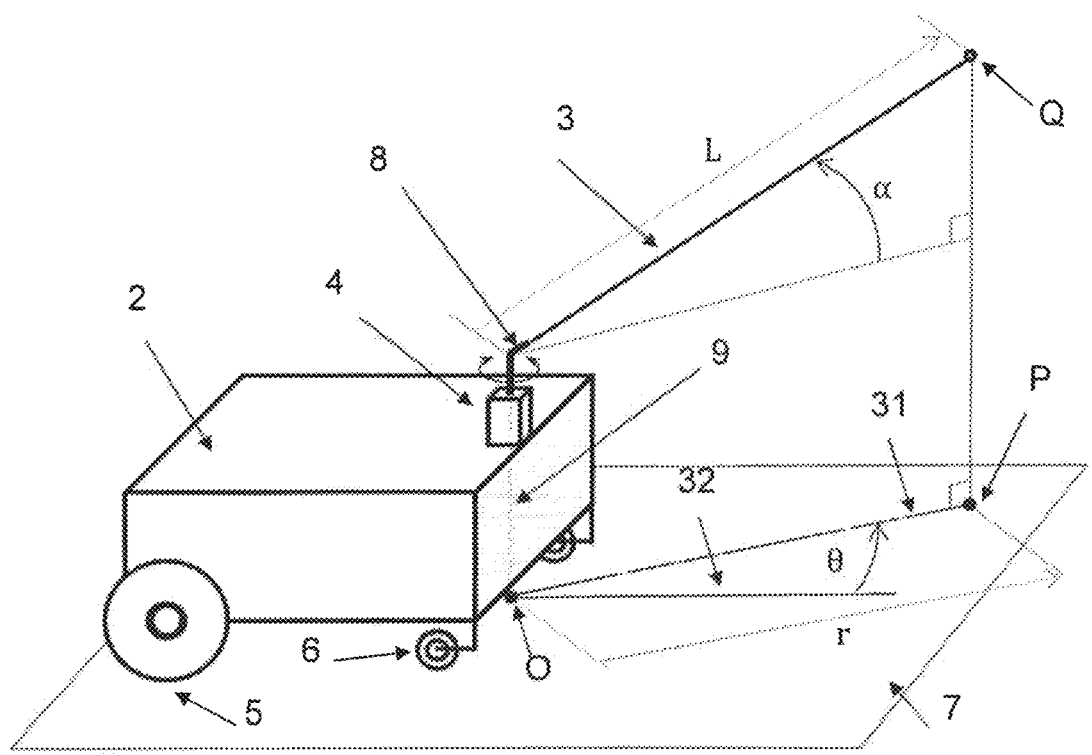
FIGS. 14A and 14B illustrate an example of a following controller.
Figure 14B:
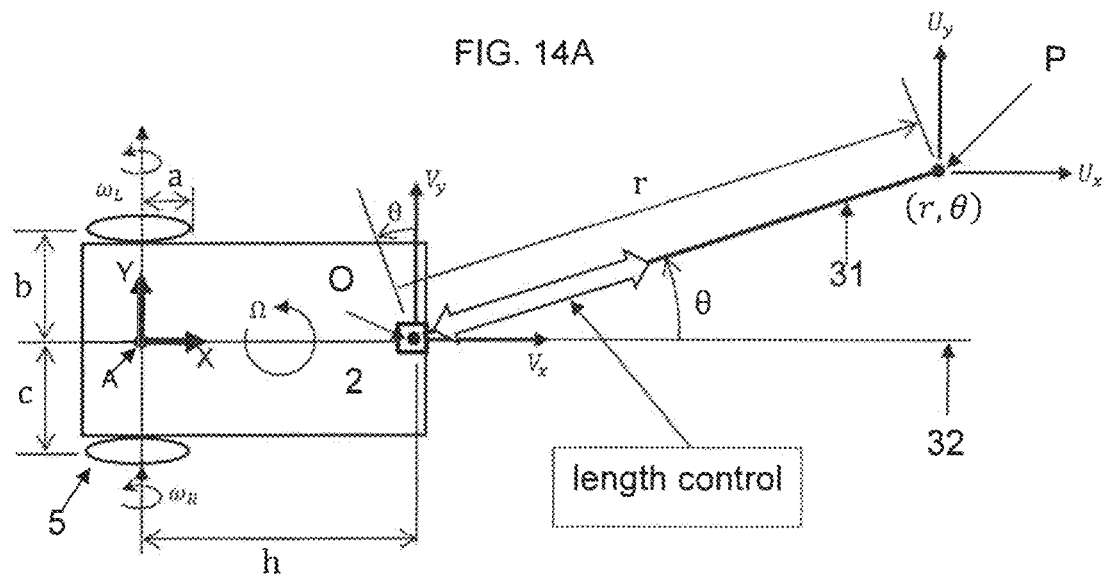

A human accompanying mode as described so far may be a primary mode of operation of the controller, in which the coordinates of a point on a moving object such as a human operator 1 with respect to the locomotion device 2 are controlled either in polar coordinates or in Cartesian coordinates. A secondary mode of operation of the locomotion device 2 may be a human following mode, in which the locomotion device 2 is controlled in a relaxed fashion. For instance, during the human following operation, only the distance between the human operator 1 and the locomotion device 2 is controlled. In other words, only the length control is executed without the angle control as shown in FIGS. 14A and 14B in contrast to the system shown in FIGS. 3A and 3B.

Figure 15:
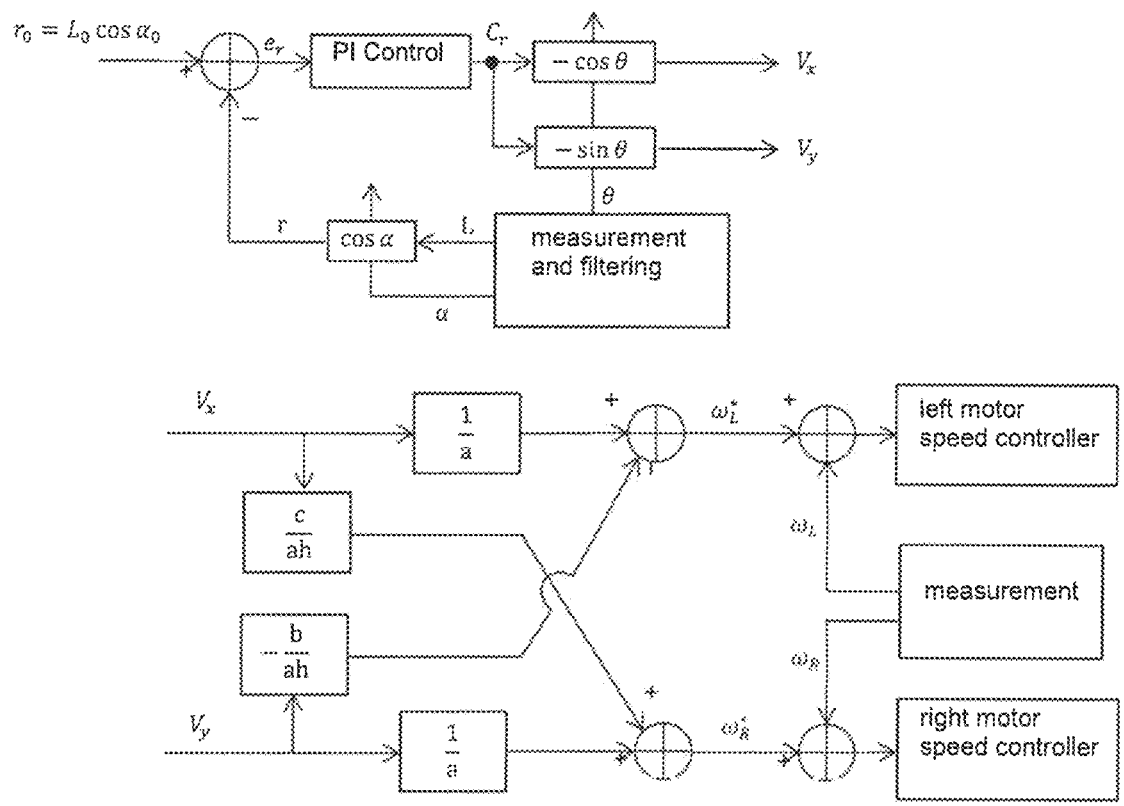
FIG. 15 illustrates a block diagram of an example of a following controller.

FIG. 15 illustrates an example of a human following controller.

In some implementations, equivalent controllers are provided according to the location of a sensor for polar coordinates measurement.

As illustrated in FIGS. 4, 5, 7, 9, 11, 13, and 15, the controller structures include blocks whose gains are functions of geometric parameters b, c, and h, which define the point O, the location of the retractable string mechanism, i.e., the location of a sensor for polar coordinates measurement, relative to the locomotion device 2. Among these three parameters, the parameter h is placed in the denominators of the gains, and, therefore, when h=0, i.e., the point O is located on the line defined by collinear axes of two rear wheels. In this case, the controller structures shown in the FIGS. 4, 5, 7, 9, 11, 13 and 15 may not operate as the gain values may not be determined due to division by zero. However, the general applicability of the proposed controller structures regardless of the location of the sensor may be explained as follows.

Figure 12B:
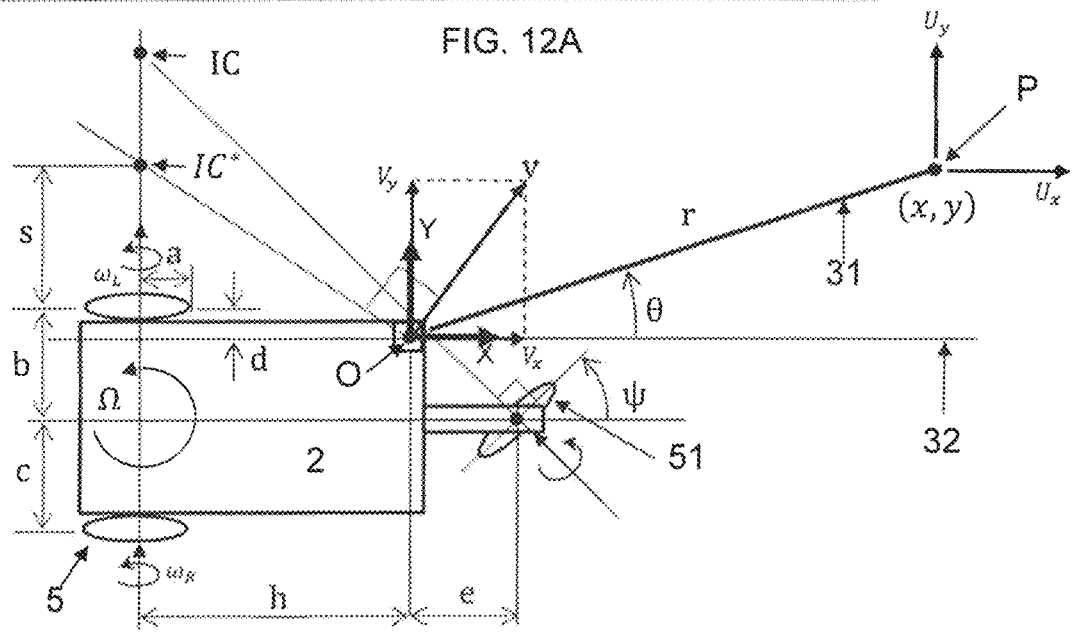
Figure 16:
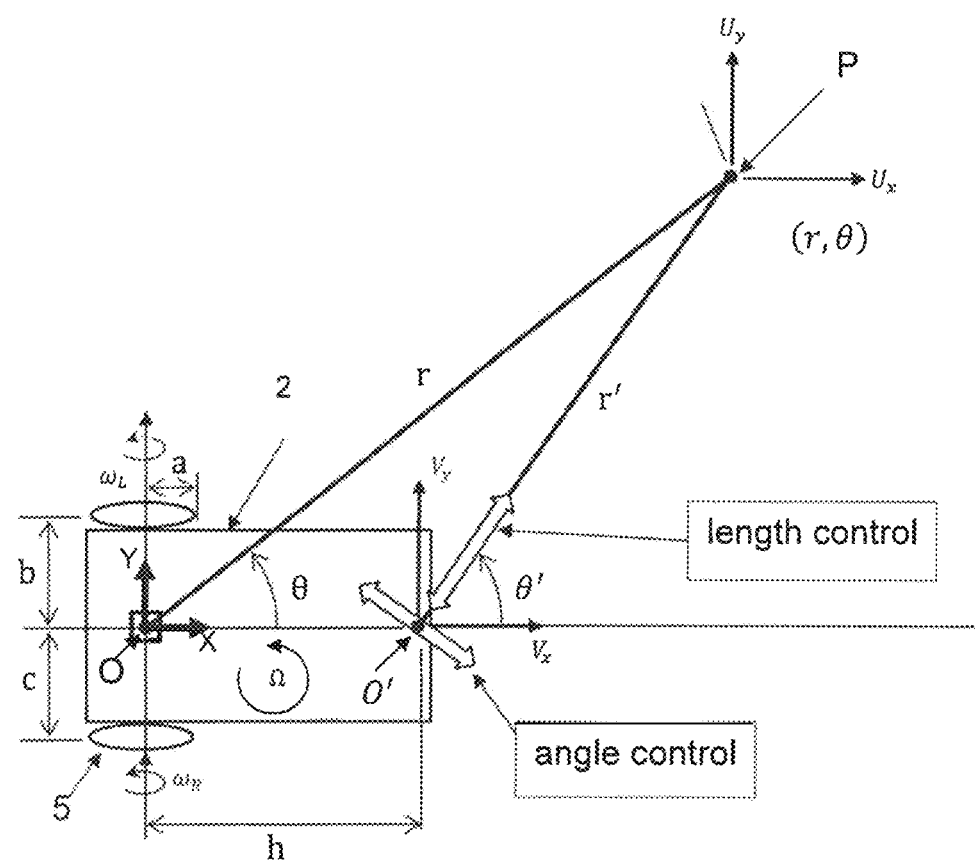
FIG. 16 illustrates an example of a non-collocated control system including a sensor located at a position different from a location of a controlled point.

FIG. 16 shows an example of a differential drive locomotion system. In this example, a retractable string mechanism is located at the point O defined on the line of collinear axes of two driving wheels 5. Further, an imaginary point O' may be set up at a point off the line of the common axes of two wheels as shown in FIG. 12B, and the point O' can be used as a new control point of the device. In other words, the locomotion system is a non-collocated system where the location of the sensor and the location of the control point are different. Nonetheless, the measurements r and θ obtained from the retractable string mechanism at the point O may easily be transformed into the measurements r' and θ' that would have been obtained if the retractable string mechanism were located at the point O'.

$$r' = \{r^2 \sin^2 \theta + (r \cos \theta - h)^2\}^{1/2} \qquad \text{Eqn. <54>}$$

$$\theta' = a \tan 2(r \sin \theta, r \cos \theta - h) \qquad \text{Eqn. <55>}$$

Therefore, replacing two variables r and θ by the new r' and θ' obtained from Eqns. <54> and <55> results in a controller that is equivalent to the ones shown in the FIGS. 4, 5, 7, 9, 11, 13 and 15. This demonstrates that the basic idea involved in designing a human following controller presented in the present disclosure can be applied regardless of the sensor location.

Hereinafter, one or more systems and methods to measure polar coordinates of human relative to the locomotion device will be described.

Figure 17:
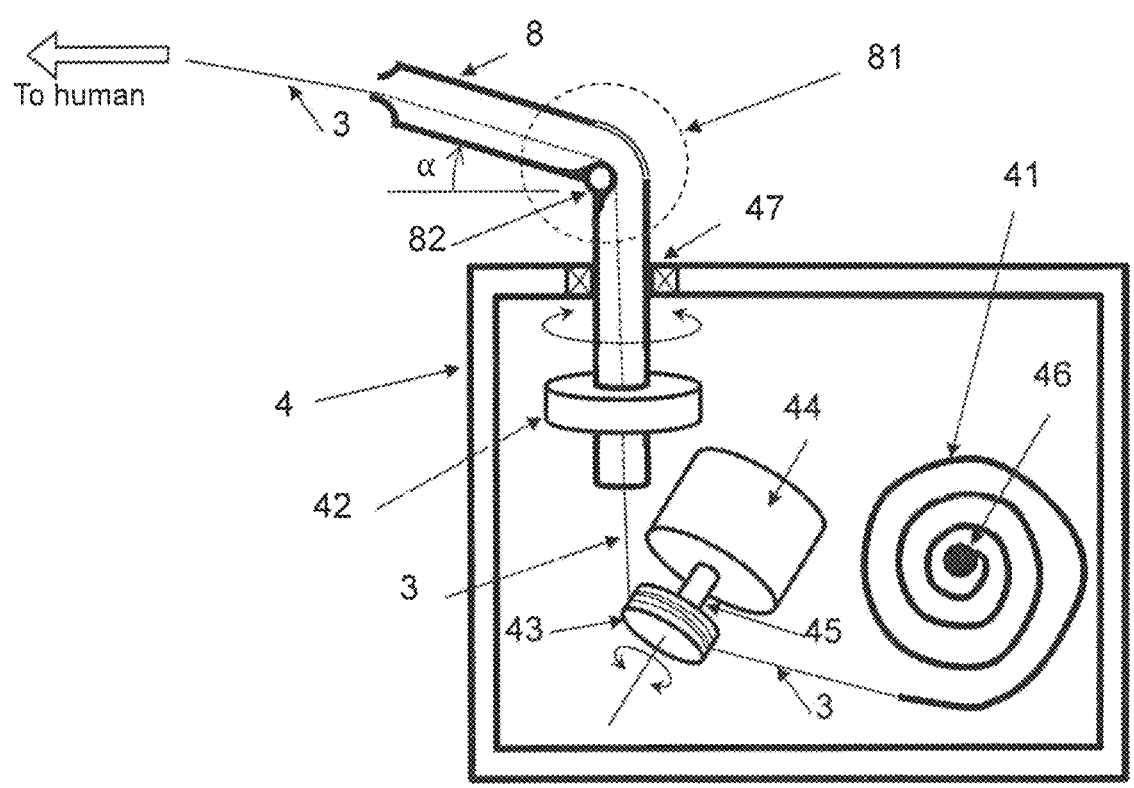
FIG. 17 illustrates an example of a polar coordinates measurement system including a string configured to be retracted by a spiral torsion spring.

FIG. 17 illustrates an example of a retractable string mechanism. The retractable string mechanism 4 includes a body disposed at the locomotion device 2 (see FIG. 1), a spiral torsion spring 41 having an end connected to the string 3. The spiral torsion spring 41 allows the string 3 to be retracted by applying a tension. The retractable string mechanism 4 may include other types of tension devices configured to provide tension to the string 3 to thereby allow the string 3 to be retracted to the body. The retractable string mechanism 4 further includes a pulley 43. In order to prevent the string 3 from slipping on the pulley 43, the string 3 is wound several turns around the pulley 43 before it passes through the string dispensing tube 8.

The retractable string mechanism 4 further includes a sensor 44 configured to measure a length L of a portion of the string 3 dispensed from the retractable string mechanism 4. The sensor 44 measures the length L by detecting a rotational motion of the pulley 43 about a shaft 45 relative to the retractable string mechanism 4 where the radius of the pulley 43 is assumed to be known. The retractable string mechanism 4 further includes a bearing 47 that mounts the string dispensing tube 8 and that allows the string dispensing tube 8 to rotate relative to the retractable string mechanism 4. The string dispensing tube 8 is configured to rotate based on the orientation of the human operator 1 relative to the retractable string mechanism 4.

The retractable string mechanism 4 further includes a tube bending mechanism 81, an angle sensor 82, and an angle sensor 42. The angle sensor 82 is installed at the tube bending mechanism 81 and configured to measure the elevation angle α of the string 3. The angle sensor 42 is disposed inside the retractable string mechanism 4 and configured to measure the orientation angle θ of the human operator 1 relative to the retractable string mechanism 4 based on detecting a rotational motion of the string dispensing tube 8 relative to the retractable string mechanism 4.

In some implementations, r can be measured indirectly by measuring L and α, i.e., r=L cos α. In some cases, the elevation angle α may be assumed to be constant or zero, in which a measuring process of the elevation angle may be omitted.

Figure 18:
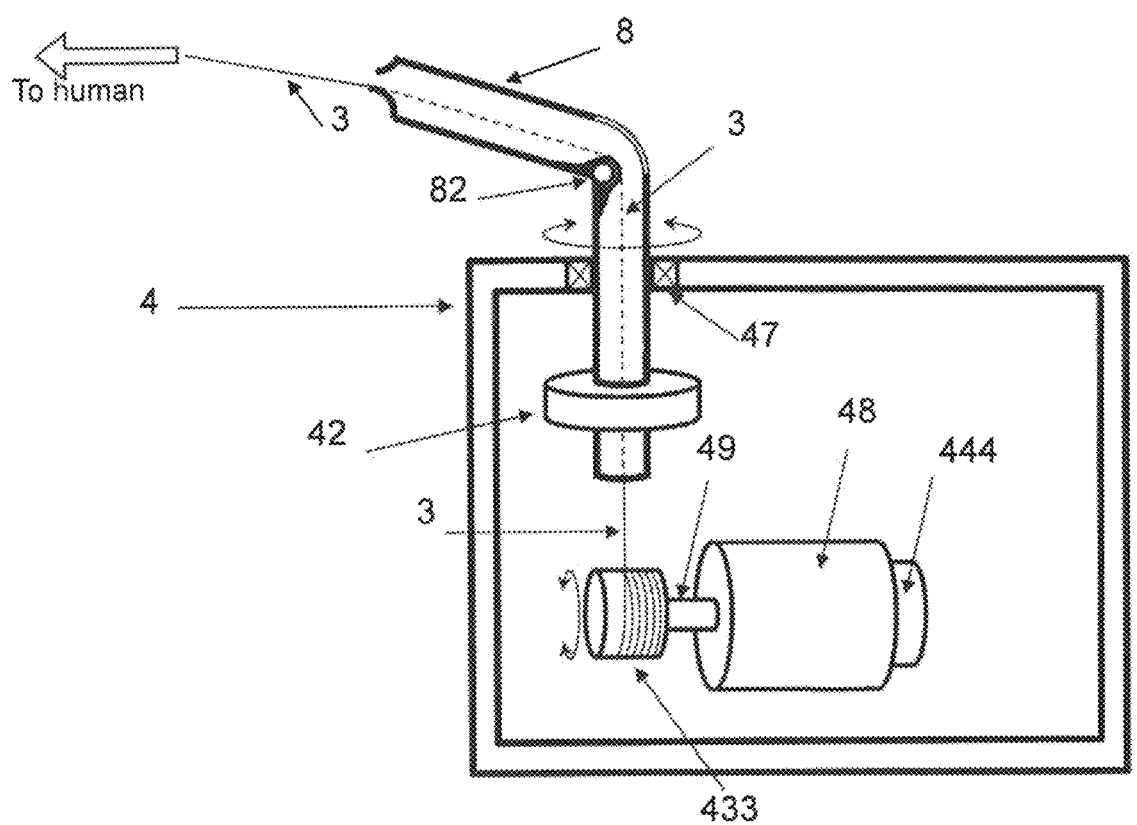
FIG. 18 illustrates an example of a polar coordinates measurement system including a string configured to be retracted by an electrical motor.

FIG. 18 shows another example of a retractable string mechanism. In contrast to the example in FIG. 17, which includes a spiral torsion spring, the retractable string mechanism 4 in FIG. 18 includes an electrical motor 48 configured to actively control a tension of the string 3. In some examples, the retractable string mechanism 4 may further include a reel 433 connected to a shaft 49 of the electric motor 48 and configured to dispense the string 3. The electric motor 48 is configured to apply torque to the shaft 49 to generate controllable tension in the string 3. The retractable string mechanism 4 may further include a rotary encoder 444 configured to detect a rotational motion of the reel 433 and determine a length L of a portion of the string 3 dispensed from the string dispensing tube 8, where the radius of the reel 433 is assumed to be known.

Figure 19:
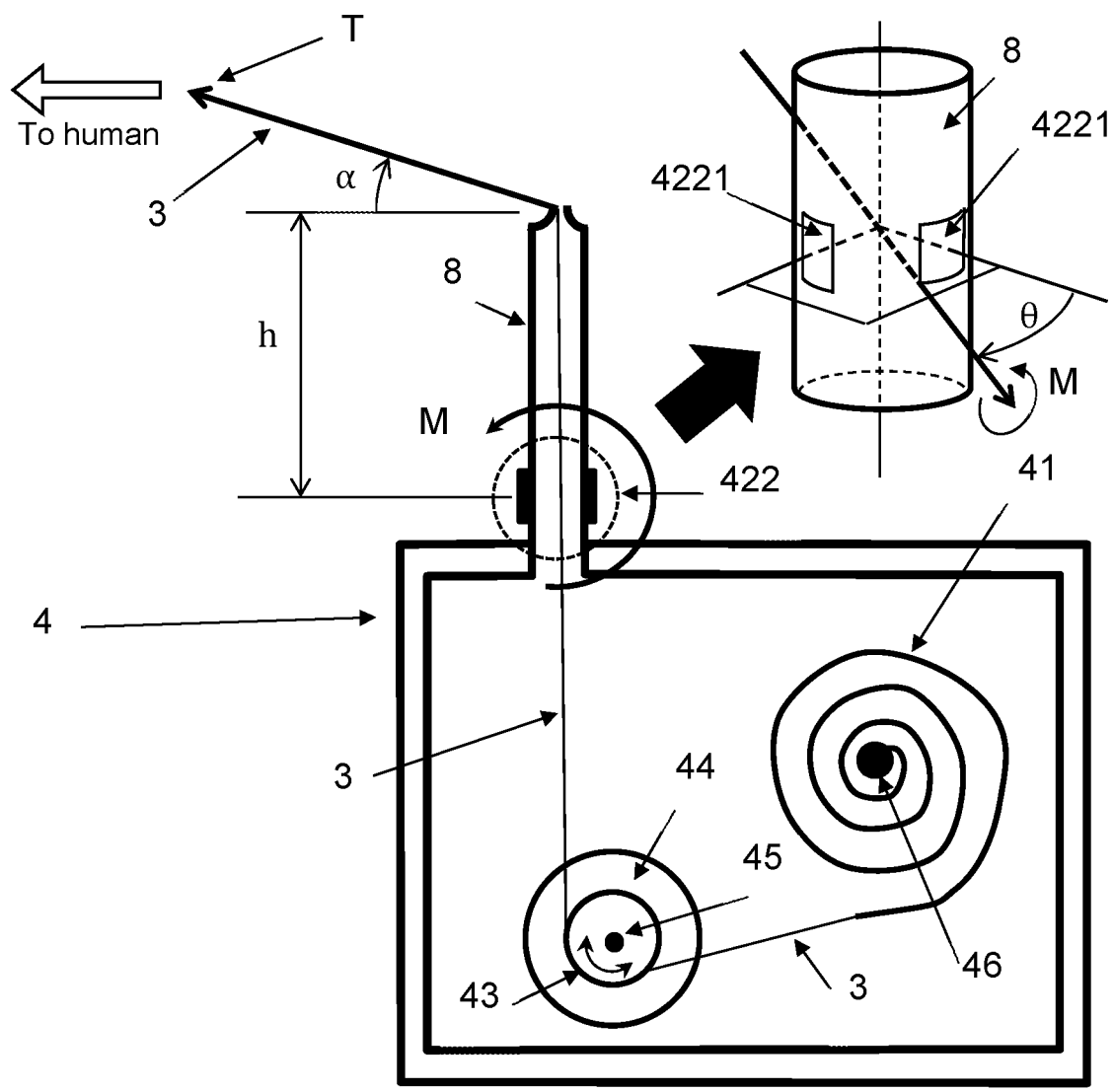
FIG. 19 illustrates an example of measuring an orientation of a string by a force sensor.

FIG. 19 shows another example of measuring an orientation of the string 3 relative to the retractable string mechanism 4 utilizing a force transducer 422. In this example, the string dispensing tube 8 is fixed to the retractable string mechanism 4, and the force transducer 422 is installed at the lower part of the string dispensing tube 8. The force transducer 422 may be configured to detect a bending moment M=hT cos α created by the tension T in the string 3.

In some implementations, the force transducer 422 includes two strain gauges 4221 that are disposed on a surface of the string dispensing tube 8 and that are spaced apart from each other by 90 degrees about a center of the string dispensing tube 8. The two strain gauges 4221 detect signals corresponding to a bending moment M created by the string tension T, and the signals may be combined to determine information regarding magnitude and orientation angle θ of the resulting moment M. Based on the information regarding the magnitude and orientation angle θ of the resulting moment M, information regarding a magnitude and orientation of the tension T may be determined. In this example, the retractable string mechanism 4 omits a bearing that enables rotation of the string dispensing tube 8 with respect to the retractable string mechanism and a sensor that detects rotational motion of the string dispensing tube 8 relative to the retractable string mechanism 4.

Figure 20:
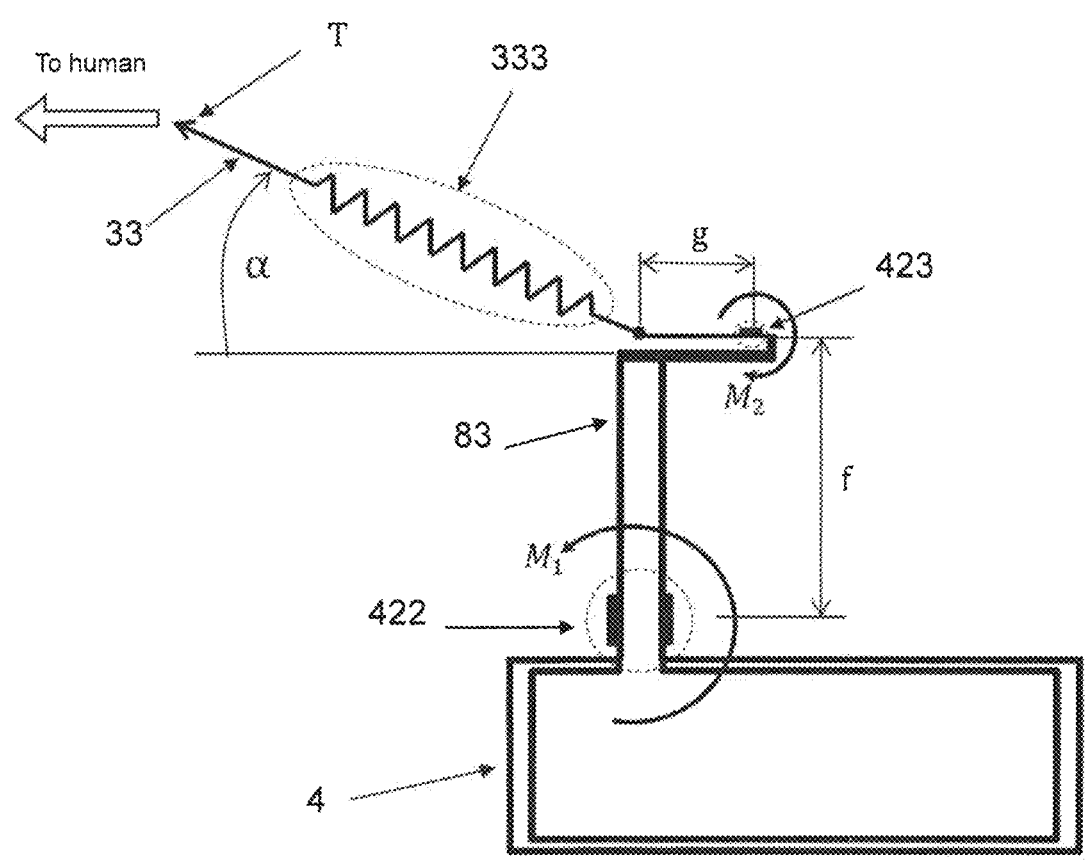
FIG. 20 illustrates an example of measuring a length and an orientation of a string by force sensors.

FIG. 20 depicts another example of a retractable string mechanism. In this example, a string 33 is made of an elastic material or connected to an elastic element 333 such as a coil spring. A total length L of the string 33 is measured by adding a natural length of the string 33 (i.e., a length when the tension T is negligible or less than a threshold value) and an elongated length of the string 33 due to the tension T. The retractable string mechanism 4 includes two force transducers 422 and 423 that enable estimation of the elongated length of the string 33 due to the tension T.

For example, when the tension T is applied to the string 33, bending moments applied to the force transducers 422 and 423 are measured respectively as $M_1$=fT cos α and $M_2$=gT sin α, where f denotes a vertical distance from the force transducer 422 to an end of the string 33, and g denotes a horizontal distance between the force transducer 423 and the end of the string 33. From these two measurements, the tension T may be found as $$T = \frac{M_1}{f \cos \alpha}$$

$$\text{where } \alpha = \tan^{-1} \frac{gM_2}{fM_1}$$

The elongated length may be estimated based on a relationship of the string 33 between the tension and elongation. For example, the elongated length of the string 33 may be proportional to the tension T.

Figure 21:
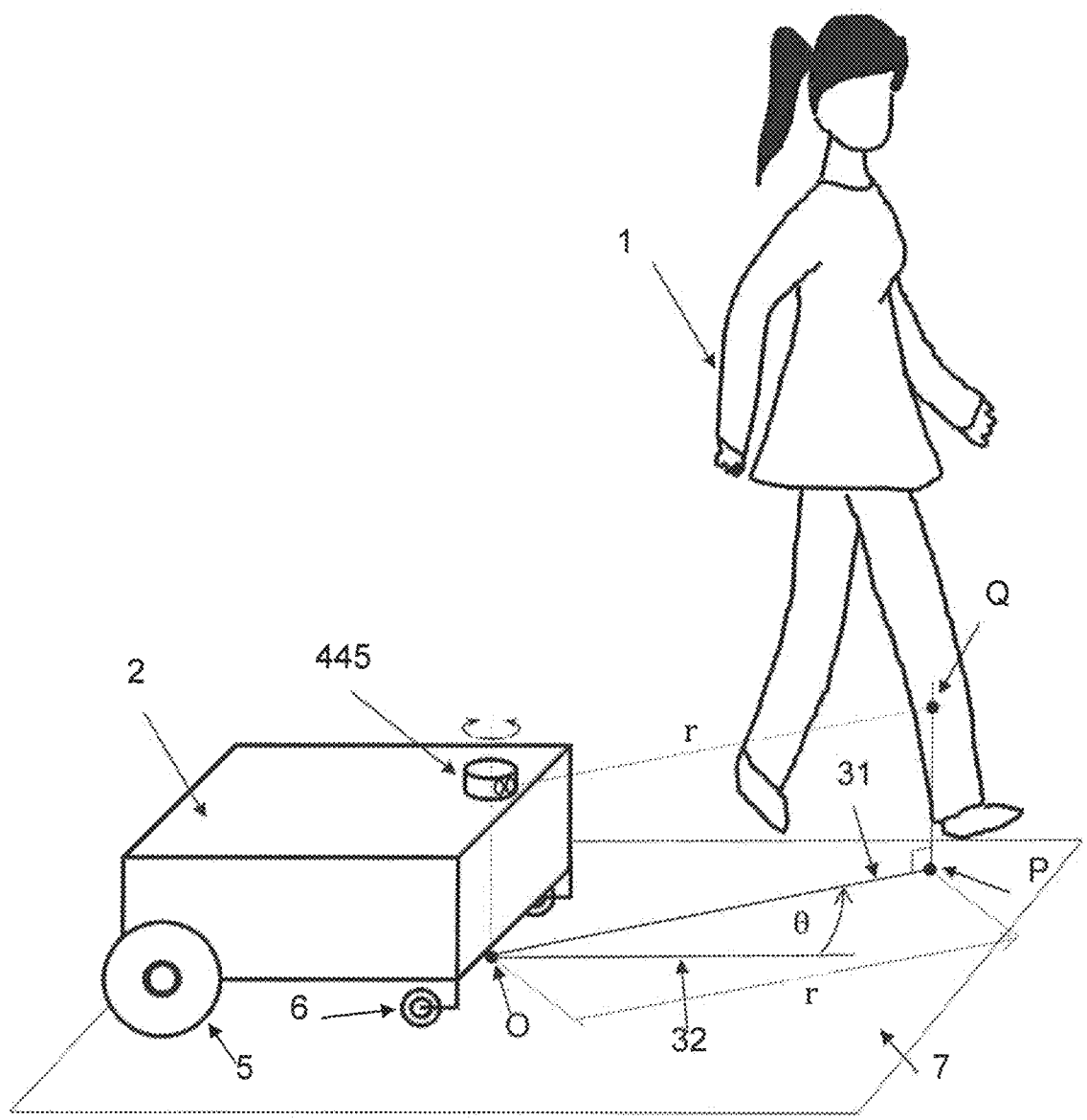
FIG. 21 illustrates an example of wireless polar coordinates measurement system using a laser distance measurement system or stereo camera system.

FIG. 21 shows an example of a wireless polar coordinate measurement system. In some implementations, the wireless measurement system 445 uses a laser distance measurement system like LiDAR (Light Detection and Ranging) systems or a rotatable camera system configured to provide distance (or depth) information. In some examples, the wireless polar coordinate measurement system may include a stereo camera system or a Kinect sensor. In this example shown in FIG. 21, the point Q represents a feature point on the moving object 1 (e.g., a human) detected by the wireless polar coordinate measurement system.

The wireless polar coordinate measurement system may be configured to measure a distance r as a function of an angle θ, and determine the parameters r and θ among a set of distance data corresponding to multiple positions of the moving object 1. Various methods may be applied to extract the feature point Q from the set of distance data. As one example, the wireless polar coordinate measurement system determines a point that corresponds the shortest distance among the set of distance data as the feature point Q. This is because it is safe to maintain a proper distance between the locomotion device 2 and the moving object 1.

Figure 22:
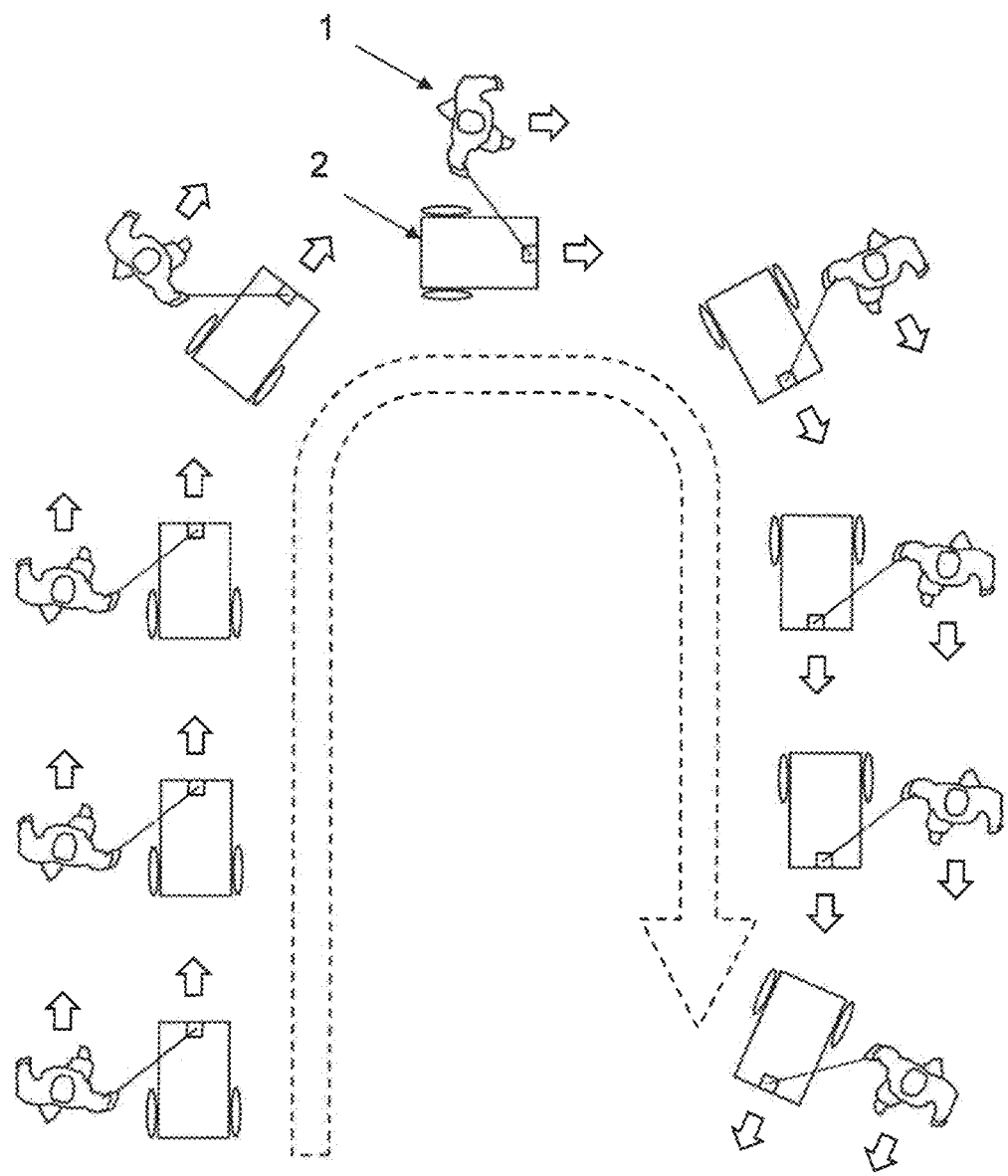
FIG. 22 illustrates an example of a human accompanying operation using differential drive locomotion device.

FIG. 22 illustrates an example of a human accompanying locomotion device under operation. In this example, the position the locomotion device 2 relative to the human operator 1 is controlled to be unchanged. In some examples, the position of the locomotion device 2 is controlled to be within a range from the human operator 1.

Figure 23:
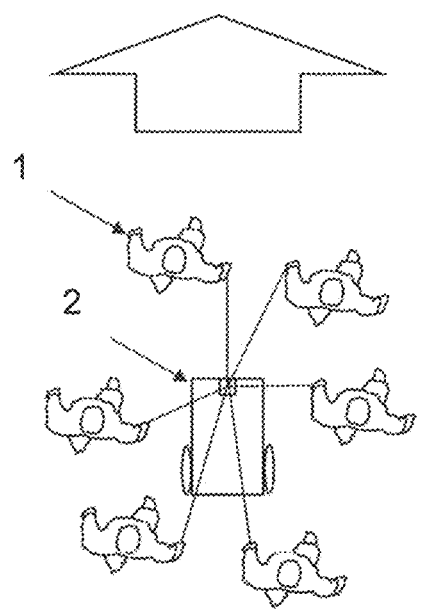
FIG. 23 illustrates example positions of a human operator in example human accompanying operations.

FIG. 23 illustrates examples of relative positions a locomotion device from a human operator. In this example, the human operator 1 is positioned at an arbitrary location relative to the locomotion device 2 and may change the position during operation as desired. This flexibility provides a great practicality to a human operator during the accompanying operation.

Figures 24A, 24B:
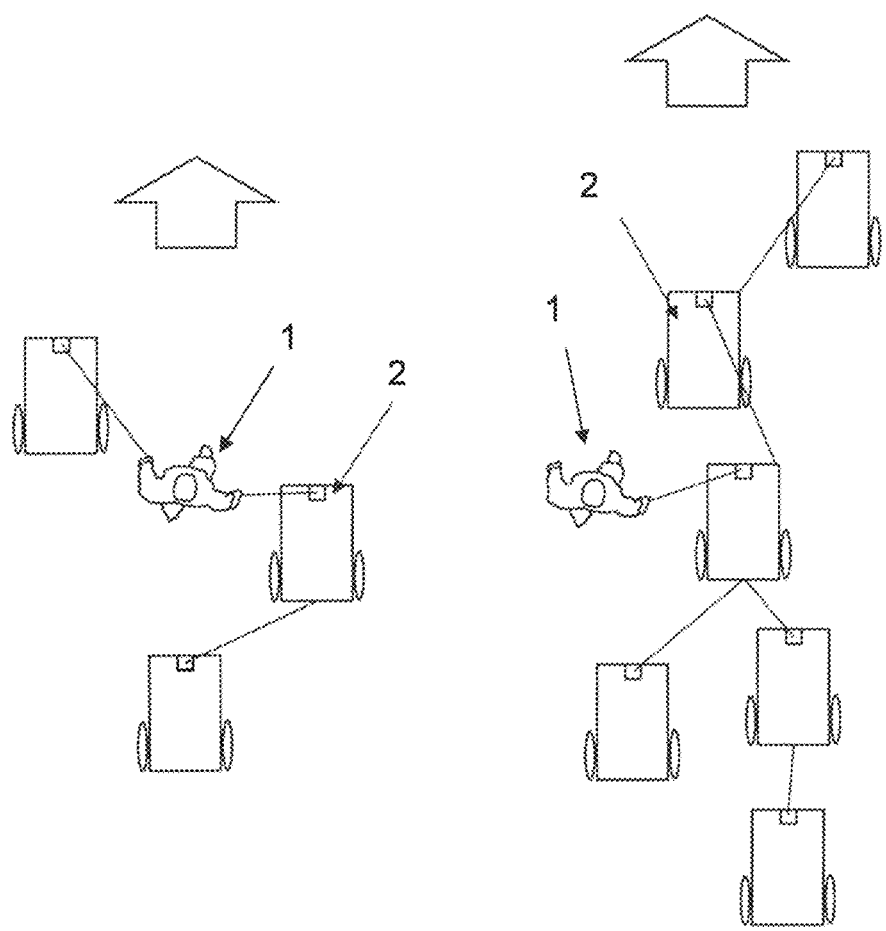
FIGS. 24A and 24B illustrate examples of human accompanying operations with a plurality of locomotion devices.

FIGS. 24A and 24B illustrate examples of human accompanying operations. In these examples, a human operator 1 is accompanied by a multiple number of locomotion devices 2 that are interconnected to one another other in series, in parallel, or in any combination thereof. In some implementations, the human operator 1 is accompanied primarily by one or more primary locomotion devices directly connected to human operator 1. Those primary locomotion devices serve as moving objects for other secondary locomotion device(s) connected to the primary locomotion devices, and the successive accompanying operations may be continued until every locomotive device becomes a part of a hierarchical connection including the primary locomotion devices and the secondary locomotion devices.

In some implementations, the system including multiple locomotion devices 2 may be operated by the human operator 1 such that an overall configuration of the whole system (e.g., relative positions of the locomotion devices 2 with respect to the human operator 1) is maintained by controlling a relative position between the two neighboring locomotion devices in the hierarchical connection of the multiple locomotion device 2.

Figure 25:
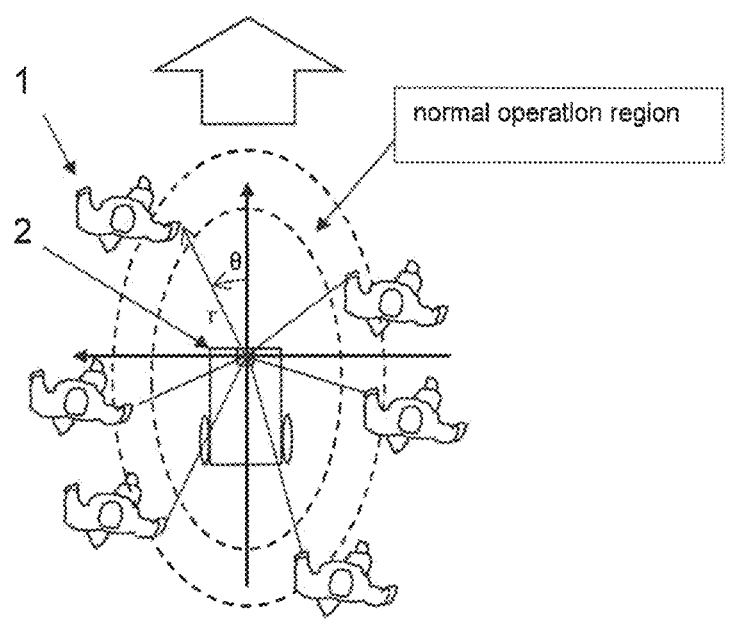
FIG. 25 illustrates an example of a programmable region defined around an example locomotion device.

FIG. 25 illustrates an example of programmable boundaries that define reference geometric regions of control. For instance, in the example in FIG. 25, the boundaries illustrated in broken curves are defined using two oval shapes, but can be defined in arbitrary shapes in other examples. The boundaries may be used in controlling behaviors of the locomotion device 2 depending on which region the human is located in.

For example, when the human operator is located inside the region between the two oval boundaries, the locomotion device 2 may be controlled to perform a normal accompanying operation. When the human operator 1 is located inside the smaller oval boundary, the locomotion device 2 may halt the accompanying operation. When the human operator 1 is located outside of the larger oval boundary, the locomotion device 2 is programmed to generate a warning signal to notify the human operator 1 that the locomotion device 2 is likely outside of a control range of the accompanying operation.

Figure 26:
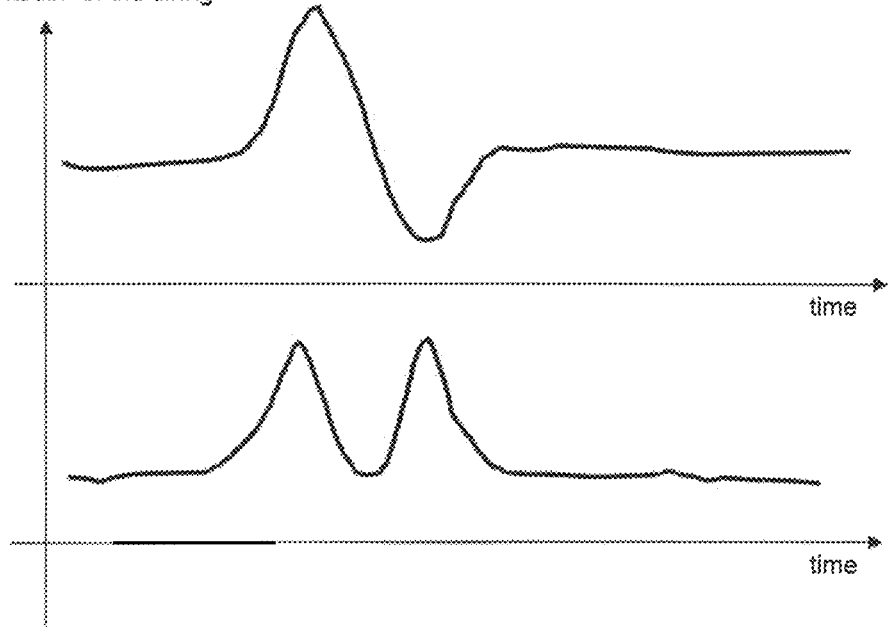
FIG. 26 illustrates example gesture signals corresponding to changes in at least one of a length or an orientation of a string that connects a moving object and a locomotion device.
Figure 27A:
FIGS. 27A-27G illustrate example applications of accompanying control.
Figure 27B:
Figure 27C:
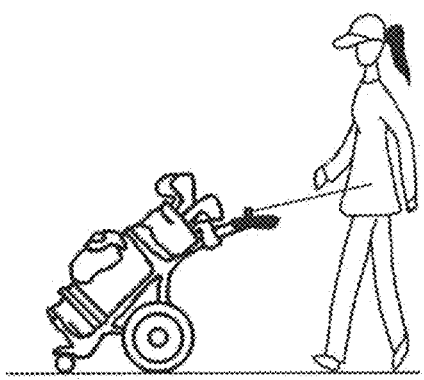
Figure 27D:
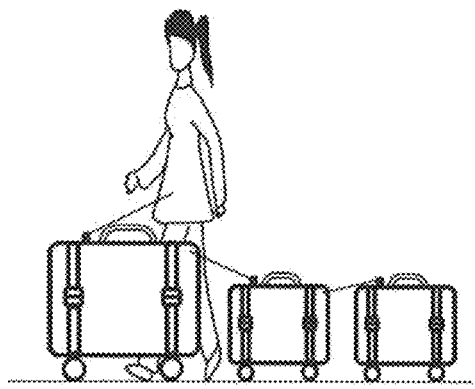
Figure 27E:
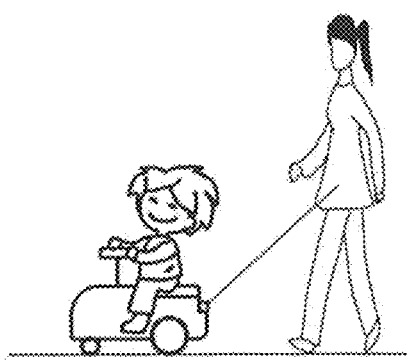
Figure 27F:
Figure 27G:
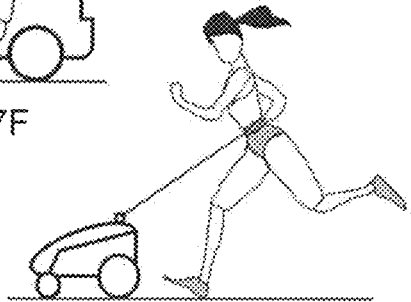

FIG. 26 illustrates examples of graphs of the length L of the string 3 in FIG. 2 (or, equivalently, the variable r) and/or the orientation θ of the string plotted as a function of time. That is, the upper and lower graphs in FIG. 26 may represent example fluctuation patterns of the length L of the string. In some examples, the upper and lower graphs in FIG. 26 may represent example fluctuation patterns of the orientation θ of the string. In some cases, one of the upper and lower graphs represents an example fluctuation pattern of the length L of the string, and the other of the upper and lower graphs represents an example fluctuation pattern of the orientation θ of the string. The fluctuation patterns shown in the graphs may be created intentionally by the human operator 1 and can be recognized as gestures (or signals) that are acknowledged by the locomotion device 2. For example, the locomotion device 2 may be configured to, based on the recognized gestures or signals, perform predetermined tasks such as halting, continuing, or changing mode of operation of the locomotion device 2 in an accompanying operation.

FIGS. 27A-27G depict various application examples of accompanying control devices according to the present disclosure. As shown in FIGS. 27A-27G, the present disclosure may be implemented in various applications such as shopping carts, strollers, golf carts, travel luggage, toy cars, and jogging guiders. The accompanying control of one or more locomotion devices may be implemented by controlling at least two degrees of freedom of motion on the ground. The accompanying control may control operation of a locomotion device or a group of locomotion devices even in a congested environment.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a non-transitory memory such as a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system configured to accompany a moving object, the system comprising:
   at least one locomotion device configured to move on a ground surface and to be controlled based on at least two degrees of freedom of motion on the ground surface, the locomotion device comprising two driving wheels; and
   a coordinates measurement unit configured to measure coordinates of a point on the moving object with respect to a reference frame XY that is fixed to the locomotion device; and
   wherein the point on the moving object is defined as one of:
      a polar coordinate (r, θ) with respect to a polar coordinate system with an origin at a control point fixed to the locomotion device, where r denotes a distance between the point on the moving object and the control point, and θ denotes an angle in a counterclockwise direction between a fixed reference line projected forward of the locomotion device and a line connecting the control point to the point on the moving object, or
      a Cartesian coordinate (x, y) with respect to a Cartesian coordinate system with an origin located at a control point fixed to the locomotion device, where x denotes a value on an X-axis pointing forward of the locomotion device, and y denotes a value in a Y-axis pointing to a left of the locomotion device,
   wherein the system satisfies a first kinematic equation group or a second kinematic equation group,
   wherein the first kinematic equation group comprises:

$$\frac{dr}{dt} = U_r - V_r, \text{ and}$$

$$\frac{d\theta}{dt} = \frac{1}{r}U_\theta - \frac{\sin\theta}{h}V_r - \left(\frac{1}{r} + \frac{\cos\theta}{h}\right)V_\theta,$$

where t denotes time, $U_r$ and $U_\theta$ denote polar coordinate components of a velocity vector of the point on the moving object, $V_r$ and $V_\theta$ denote polar coordinate components of a velocity vector of the control point on the locomotion device, h denotes a perpendicular distance between the control point and collinear axes of the two driving wheels, and wherein the second kinematic equation group comprises:

$$\frac{dx}{dt} = U_x - V_x + \frac{y}{h}V_y, \text{ and}$$

$$\frac{dy}{dt} = U_y - \left(\frac{h+x}{h}\right)V_y,$$

where $U_x$ and $U_y$ denote Cartesian coordinates components of the velocity vector of the point on the moving object, $V_x$ and $V_y$ denote Cartesian coordinates components of the velocity vector of the control point on the locomotion device, wherein the system further comprises a controller configured to:
   based on the polar coordinates components $U_r$ and $U_\theta$, generate the polar coordinates components $V_r$ and $V_\theta$ to thereby maintain the point on the moving object at pre-set polar coordinates (r*, θ*) with respect to the polar coordinate system, or
   based on the Cartesian coordinates components $U_x$ and $U_y$, generate the Cartesian coordinates components $V_x$ and $V_y$ to thereby maintain the point on the moving object at pre-set polar coordinates (x*, y*) with respect to the Cartesian coordinate system.

2. The system according to claim 1, wherein the locomotion device comprises one of:
   an omnidirectional-drive device configured to drive the locomotion device based on three degrees of freedom of motion on the ground surface;
   a differential-drive device comprising two wheels configured to rotate about rotation axes that are collinear and that are configured to be independently controlled;
   a tricycle-drive device comprising at least one steering wheel configured to control a travel direction of the locomotion device and at least one driving wheel configured to move the locomotion device; or
   a legged-drive device comprising at least two legs that are configured to be independently controlled.

3. The system according to claim 1, wherein the coordinates measurement unit comprises a retractable string mechanism comprising:
   a body disposed at the locomotion device;
   a string configured to be dispensed from and retracted into the body;
   a first rotary sensor configured to measure a length of a dispensed portion of the string;
   a second rotary sensor configured to measure an orientation of the dispensed portion of the string with respect to the locomotion device; and
   a tension device configured to provide a tension to the string to thereby allow the string to be retracted into the body.

4. The system according to claim 3, wherein the tension device comprises a spiral torsion spring connected to the string.

5. The system according to claim 3, wherein the tension device comprises an electric motor connected to the string and configured to control the tension in the string.

6. The system according to claim 3, wherein the controller is further configured to:
obtain sequential data including at least one of a length or an orientation of the dispensed portion of the string as a function of time;
recognize predefined signal patterns or gestures of the moving object from the sequential data; and
perform tasks corresponding to the recognized signal patterns or gestures.

7. The system according to claim 1, wherein the coordinates measurement unit comprises a laser distance measurement system configured to output light and receive returned light, and
wherein the laser distance measurement system is configured to:
generate a set of range data including a plurality of coordinates corresponding to a plurality of points of the moving object relative to the locomotion device; and
output, among the set of range data, one of the plurality of coordinates corresponding to at least one point of the moving object relative to the locomotion device.

8. The system according to claim 1, wherein the coordinates measurement unit comprises a camera system configured to capture images, and
wherein the camera system is configured to:
based on the images, generate a set of range data including a plurality of coordinates corresponding to a plurality of points of the moving object relative to the locomotion device; and
output, from the set of range data, one of the plurality of coordinates corresponding to at least one point of the moving object relative to the locomotion device.

9. The system according to claim 1, wherein the coordinates measurement unit comprises a retractable string mechanism comprising:
a body disposed at the locomotion device;
a string configured to be dispensed from and retracted into the body;
a rotary sensor configured to measure a length of a dispensed portion of the string;
a force sensor configured to measure each of a tension in the string and an orientation of the dispensed portion of the string with respect to the locomotion device; and
a tension device configured to provide the tension to the string to thereby allow the string to be retracted into the body.

10. The system according to claim 1, wherein the coordinates measurement unit comprises a retractable string mechanism comprising:
a string configured to be elongated by a tension applied to the string; and
a force sensor configured to measure each of the tension applied to the string, an orientation of the elongated string with respect to the locomotion device, and a length of the elongated string.

11. The system according to claim 1, wherein the controller is configured to:
in an accompanying mode, control a motion of the locomotion device based on both of (i) a distance between the moving object and the locomotion device and (ii) an angle of a direction of the moving object with respect to the locomotion device to thereby maintain the distance and the angle within a preset distance range and a preset angle range, respectively; and
in a following mode, control the motion of the locomotion device based on the distance between the moving object and the locomotion device to maintain the distance within the preset distance range.

12. The system according to claim 1, wherein the controller is further configured to:
define a plurality of regions around the locomotion device;
determine whether a position of the moving object corresponds to one of the plurality of regions; and
control a motion of the locomotion device according to the one of the plurality of regions.

13. A system configured to accompany a moving object, the system comprising:
at least one locomotion device configured to move on a ground surface and to be controlled based on at least two degrees of freedom of motion on the ground surface; and
a coordinates measurement unit configured to measure coordinates of a point on the moving object with respect to a reference frame XY that is fixed to the locomotion device,
wherein the point on the moving object is defined as one of:
a polar coordinate (r, θ) relative to a polar coordinate system with an origin at a control point fixed to the locomotion device, where r denotes a distance between the point on the moving object and the control point, and θ denotes an angle in a counterclockwise direction between a fixed reference line projected forward of the locomotion device and a line connecting the control point to the point on the moving object, or
a Cartesian coordinate (x, y) with respect to a Cartesian coordinate system with an origin at a control point fixed to the locomotion device, where x denotes a value on an X-axis pointing forward of the locomotion device, and y denotes a value in a Y-axis pointing to a left of the locomotion device,
wherein the system further comprises a controller configured to:
obtain Cartesian coordinates components $U_x$ and $U_y$ of a velocity vector of the point on the moving object by using equations:

$$U_x = V_x + \dot{r}\cos\theta - r(\Omega - \dot{\theta})\sin\theta, \text{ and}$$

$$U_y = V_y + \dot{r}\sin\theta + r(\Omega - \dot{\theta})\cos\theta,$$

where $\dot{r}$ and $\dot{\theta}$ denote time rates of r and θ, respectively, and Ω denotes an angular velocity of the locomotion device that is defined positive based on the locomotion device turning to the left,
obtain a direction of motion of the point on the moving object relative to the locomotion device by using an equation $\phi = \mathrm{a\,tan\,2}(U_y, U_x)$, where φ represents the direction of motion of the point on the moving object relative to the X-axis,
establish a new reference frame $X_p Y_p$ with an origin at the point on the moving object, define coordinates of the control point with respect to the reference frame $X_pY_p$ as controlled variables, and control motion of the locomotion device to thereby maintain the controlled variables within pre-set ranges.

14. A system configured to accompany a moving object, the system comprising:

at least one locomotion device configured to move on a ground surface and to be controlled based on at least two degrees of freedom of motion on the ground surface;

a coordinates measurement unit configured to measure coordinates of a point on the moving object with respect to the locomotion device; and a controller configured to, based on the coordinates of the point on the moving object with respect to the locomotion device, control a motion of the locomotion device to maintain a position of the point on the moving object within a preset range with respect to the locomotion device, wherein the coordinates of the point on the moving object with respect to the locomotion device is determined based on coordinates of any one point on the moving object measured with respect to a reference frame XY fixed to the locomotion device, wherein the coordinates measurement unit comprises a laser distance measurement system configured to output light and receive returned light, and wherein the laser distance measurement system is configured to:

generate a set of range data including a plurality of coordinates corresponding to a plurality of points of the moving object relative to the locomotion device; and output, among the set of range data, one of the plurality of coordinates corresponding to at least one point of the moving object relative to the locomotion device.

15. A system configured to accompany a moving object, the system comprising:

at least one locomotion device configured to move on a ground surface and to be controlled based on at least two degrees of freedom of motion on the ground surface;

a coordinates measurement unit configured to measure coordinates of a point on the moving object with respect to the locomotion device; and a controller configured to, based on the coordinates of the point on the moving object with respect to the locomotion device, control a motion of the locomotion device to maintain a position of the point on the moving object within a preset range with respect to the locomotion device, wherein the coordinates of the point on the moving object with respect to the locomotion device is determined based on coordinates of any one point on the moving object measured with respect to a reference frame XY fixed to the locomotion device, wherein the coordinates measurement unit comprises a camera system configured to capture images, and wherein the camera system is configured to:

based on the images, generate a set of range data including a plurality of coordinates corresponding to a plurality of points of the moving object relative to the locomotion device; and output, from the set of range data, one of the plurality of coordinates corresponding to at least one point of the moving object relative to the locomotion device.

16. A system configured to accompany a moving object, the system comprising:

at least one locomotion device configured to move on a ground surface and to be controlled based on at least two degrees of freedom of motion on the ground surface;

a coordinates measurement unit configured to measure coordinates of a point on the moving object with respect to the locomotion device; and a controller configured to, based on the coordinates of the point on the moving object with respect to the locomotion device, control a motion of the locomotion device to maintain a position of the point on the moving object within a preset range with respect to the locomotion device, wherein the coordinates of the point on the moving object with respect to the locomotion device is determined based on coordinates of any one point on the moving object measured with respect to a reference frame XY fixed to the locomotion device, wherein the coordinates measurement unit comprises a retractable string mechanism comprising:

a body disposed at the locomotion device;

a string configured to be dispensed from and retracted into the body;

a first rotary sensor configured to measure a length of a dispensed portion of the string;

a second rotary sensor configured to measure an orientation of the dispensed portion of the string with respect to the locomotion device; and a tension device configured to provide a tension to the string to thereby allow the string to be retracted into the body, and wherein the controller is further configured to:

obtain sequential data including at least one of a length or an orientation of the dispensed portion of the string as a function of time;

recognize predefined signal patterns or gestures of the moving object from the sequential data; and perform tasks corresponding to the recognized signal patterns or gestures.

17. A system configured to accompany a moving object, the system comprising:

at least one locomotion device configured to move on a ground surface and to be controlled based on at least two degrees of freedom of motion on the ground surface;

a coordinates measurement unit configured to measure coordinates of a point on the locomotion device with respect to the moving object; and a controller configured to, based on the coordinates of the point on the locomotion device with respect to the moving object, control a motion of the locomotion device to maintain a position of the point on the locomotion device within a preset range with respect to the moving object, wherein the coordinates of the point on the locomotion device with respect to the moving object are determined based on coordinates of any one point on the locomotion device measured with respect to a reference frame $X_pY_p$ fixed to the moving object, wherein the coordinates measurement unit comprises a laser distance measurement system configured to output light and receive returned light, and wherein the laser distance measurement system is configured to:
generate a set of range data including a plurality of coordinates corresponding to a plurality of points of the moving object relative to the locomotion device; and
output, among the set of range data, one of the plurality of coordinates corresponding to at least one point of the moving object relative to the locomotion device.

18. A system configured to accompany a moving object, the system comprising:
at least one locomotion device configured to move on a ground surface and to be controlled based on at least two degrees of freedom of motion on the ground surface;
a coordinates measurement unit configured to measure coordinates of a point on the locomotion device with respect to the moving object; and
a controller configured to, based on the coordinates of the point on the locomotion device with respect to the moving object, control a motion of the locomotion device to maintain a position of the point on the locomotion device within a preset range with respect to the moving object,
wherein the coordinates of the point on the locomotion device with respect to the moving object are determined based on coordinates of any one point on the locomotion device measured with respect to a reference frame $X_p Y_p$ fixed to the moving object,
wherein the coordinates measurement unit comprises a camera system configured to capture images, and
wherein the camera system is configured to:
based on the images, generate a set of range data including a plurality of coordinates corresponding to a plurality of points of the moving object relative to the locomotion device; and
output, from the set of range data, one of the plurality of coordinates corresponding to at least one point of the moving object relative to the locomotion device.

19. A system configured to accompany a moving object, the system comprising:
at least one locomotion device configured to move on a ground surface and to be controlled based on at least two degrees of freedom of motion on the ground surface;
a coordinates measurement unit configured to measure coordinates of a point on the locomotion device with respect to the moving object; and
a controller configured to, based on the coordinates of the point on the locomotion device with respect to the moving object, control a motion of the locomotion device to maintain a position of the point on the locomotion device within a preset range with respect to the moving object,
wherein the coordinates of the point on the locomotion device with respect to the moving object are determined based on coordinates of any one point on the locomotion device measured with respect to a reference frame $X_p Y_p$ fixed to the moving object,
wherein the coordinates measurement unit comprises a retractable string mechanism comprising:
a body disposed at the locomotion device;
a string configured to be dispensed from and retracted into the body;
a first rotary sensor configured to measure a length of a dispensed portion of the string;
a second rotary sensor configured to measure an orientation of the dispensed portion of the string with respect to the locomotion device; and
a tension device configured to provide a tension to the string to thereby allow the string to be retracted into the body, and
wherein the controller is further configured to:
obtain sequential data including at least one of a length or an orientation of the dispensed portion of the string as a function of time;
recognize predefined signal patterns or gestures of the moving object from the sequential data; and
perform tasks corresponding to the recognized signal patterns or gestures.

* * * * *